(12) United States Patent
Wang et al.

(10) Patent No.: US 12,379,630 B2
(45) Date of Patent: Aug. 5, 2025

(54) LIQUID CRYSTAL HANDWRITING BOARD AND MANUFACTURING METHOD THEREFOR

(71) Applicants: BOE Technology Group Co., Ltd., Beijing (CN); Beijing BOE Optoelectronics Technology Co., Ltd., Beijing (CN); Shandong Lanbeisite Educational Equipment Group, Shandong (CN)

(72) Inventors: Jiaxing Wang, Beijing (CN); Jian Wang, Beijing (CN); Xiaojuan Wu, Beijing (CN); Hongliang Yuan, Beijing (CN); Xiuliang Wang, Beijing (CN); Yao Bi, Beijing (CN); Jinshuai Duan, Beijing (CN); Feng Liu, Beijing (CN); Cuiyu Chen, Beijing (CN); Yang Ge, Beijing (CN); Zhilong Duan, Beijing (CN); Zhiqiang Yu, Beijing (CN); Tianyang Han, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN); SHANDONG LANBEISITE EDUCATIONAL EQUIPMENT GROUP, Shandong (CN)

( * ) Notice: Subject to any disclaimer, the term of this patent is extended or adjusted under 35 U.S.C. 154(b) by 0 days.

(21) Appl. No.: 18/019,244

(22) PCT Filed: Jan. 29, 2022

(86) PCT No.: PCT/CN2022/075125
§ 371 (c)(1),
(2) Date: Feb. 2, 2023

(87) PCT Pub. No.: WO2023/142092
PCT Pub. Date: Aug. 3, 2023

(65) Prior Publication Data
US 2024/0272467 A1    Aug. 15, 2024

(51) Int. Cl.
*G02F 1/1347*     (2006.01)
*G02F 1/1333*     (2006.01)
(Continued)

(52) U.S. Cl.
CPC .......... *G02F 1/1347* (2013.01); *G02F 1/1333* (2013.01); *G02F 1/1362* (2013.01);
(Continued)

(58) Field of Classification Search
None
See application file for complete search history.

(56) References Cited

U.S. PATENT DOCUMENTS 9,853,067 B2 * 12/2017 Cai ................... H01L 29/78633
2008/0272375 A1    11/2008 Oh et al.
(Continued)

FOREIGN PATENT DOCUMENTS

CN    101191921 A    6/2008
CN    105717684 A    6/2016
(Continued)

*Primary Examiner* — Dung T Nguyen
(74) *Attorney, Agent, or Firm* — XSENSUS LLP

(57) ABSTRACT

Provided is a liquid crystal handwriting board. The liquid crystal handwriting board includes a first substrate, a second substrate, a third substrate, a first liquid crystal layer, and a second liquid crystal layer; wherein the first substrate includes: a first base, and a first pixel electrode and a transparent electrode, wherein the first pixel electrode is insulated from the transparent electrode, and the first pixel electrode is closer to the second substrate than the transparent electrode is; wherein the first substrate, the first liquid crystal layer and the second substrate are configured to form a display portion of the liquid crystal handwriting board; and the first substrate, the second liquid crystal layer and the third substrate are configured to form a writing portion of the liquid crystal handwriting board.

18 Claims, 13 Drawing Sheets

(51) Int. Cl.
*G02F 1/1362* (2006.01)
*G02F 1/1335* (2006.01)
*G02F 1/1343* (2006.01)
*G02F 1/1368* (2006.01)
*G02F 1/139* (2006.01)

(52) U.S. Cl.
CPC .... *G02F 1/133305* (2013.01); *G02F 1/13338* (2013.01); *G02F 1/133512* (2013.01); *G02F 1/133514* (2013.01); *G02F 1/133528* (2013.01); *G02F 1/134309* (2013.01); *G02F 1/13439* (2013.01); *G02F 1/1368* (2013.01); *G02F 1/1391* (2013.01)

(56) References Cited

U.S. PATENT DOCUMENTS

2021/0173254 A1    6/2021  Yamazaki et al.
2022/0082879 A1*   3/2022  Wang ................ G02F 1/133514

FOREIGN PATENT DOCUMENTS

| | | |
|---|---|---|
| CN | 107092110 A | 8/2017 |
| CN | 108803112 A | 11/2018 |
| CN | 108873533 A | 11/2018 |
| CN | 109116600 A | 1/2019 |
| CN | 110376779 A | 10/2019 |
| CN | 210270435 U | 4/2020 |
| CN | 111123562 A | 5/2020 |
| CN | 213240732 U | 5/2021 |
| JP | 2017-219572 A | 12/2017 |

* cited by examiner

000

100

LIQUID CRYSTAL HANDWRITING BOARD AND MANUFACTURING METHOD THEREFOR

CROSS-REFERENCE TO RELATED APPLICATION

This application is a U.S. national stage of international application No. PCT/CN2022/075125, filed on Jan. 29, 2022, the disclosure of which is herein incorporated by reference in its entirety.

TECHNICAL FIELD

The present disclosure relates to the field of display technologies, and in particular relates to a liquid crystal handwriting board and a manufacturing method therefor.

BACKGROUND OF THE INVENTION

A handwriting board is an electronic device for writing and drawing.

SUMMARY OF THE INVENTION

Embodiments of the present disclosure provide a liquid crystal handwriting board and a manufacturing method therefor. The technical solutions are as follows.

In some embodiments of the present disclosure, a liquid crystal handwriting board is provided. The liquid crystal handwriting board includes: a first substrate, a second substrate disposed on a side of the first substrate, a third substrate disposed on a side of the first substrate away from the second substrate, a first liquid crystal layer disposed between the first substrate and the second substrate, and a second liquid crystal layer disposed between the first substrate and the third substrate; wherein
  the first substrate includes: a first base, and a first pixel electrode and a transparent electrode that are disposed on a side of the first base close to the second substrate, wherein the first pixel electrode is insulated from the transparent electrode, and the first pixel electrode is closer to the second substrate than the transparent electrode is;
  wherein the first substrate, the first liquid crystal layer and the second substrate are configured to form a display portion of the liquid crystal handwriting board; and the first substrate, the second liquid crystal layer and the third substrate are configured to form a writing portion of the liquid crystal handwriting board.

In some embodiments, the transparent electrode is a shield electrode, and the first substrate further includes a second pixel electrode disposed on a side of the transparent electrode close to the first base, wherein the second pixel electrode is insulated from the transparent electrode.

In some embodiments, a plurality of first pixel electrodes and a plurality of second pixel electrodes are provided, wherein one of the second pixel electrodes corresponds to at least one of the first pixel electrodes;
  an orthographic projection of the first pixel electrode on the first base is within an orthographic projection of the corresponding second pixel electrode on the first base.

In some embodiments, the first substrate further includes a first thin film transistor electrically connected to the first pixel electrode, and a second thin film transistor electrically connected to the second pixel electrode, wherein the first thin film transistor and the second thin film transistor are disposed in a same layer.

In some embodiments, the second thin film transistor is disposed between the first pixel electrode and the transparent electrode, the transparent electrode is provided with a first via hole, and a first electrode of the second thin film transistor passes through the first via hole to be electrically connected to the second pixel electrode.

In some embodiments, the first substrate further includes: a first insulating layer disposed between the second pixel electrode and the transparent electrode, and a second insulating layer disposed between the second thin film transistor and the transparent electrode, wherein the first insulating layer is provided with a second via hole in communication with the first via hole, and the second insulating layer is provided with a third via hole in communication with the first via hole;
  wherein an orthographic projection of the second via hole on the first base and an orthographic projection of the third via hole on the first base are both within an orthographic projection of the first via hole on the first base, and the first electrode of the second thin film transistor sequentially passes through the third via hole, the first via hole and the second via hole to be electrically connected to the second pixel electrode.

In some embodiments, the first substrate further includes: a plurality of first gate lines and a plurality of first data lines that are electrically connected to a plurality of first thin film transistors, and a plurality of second gate lines and a plurality of second data lines that are electrically connected to a plurality of second thin film transistors; wherein
  an orthographic projection of one of the first gate lines on the first base is between the orthographic projections of two adjacent rows of first pixel electrodes on the first base; and an orthographic projection of one of the first data lines on the first base is between the orthographic projections of two adjacent columns of first pixel electrodes on the first base; and
  an orthographic projection of one of the second gate lines on the first base is between the orthographic projections of two adjacent rows of second pixel electrodes on the first base; and an orthographic projection of one of the second data lines on the first base is between the orthographic projections of two adjacent columns of second pixel electrodes on the first base;
  wherein the orthographic projection of one of the first gate lines on the first base and the orthographic projection of one of the second gate lines on the first base are simultaneously between the orthographic projections of two adjacent rows of second pixel electrodes on the first base; and
  wherein the orthographic projection of one of the first data lines on the first base and the orthographic projection of one of the second data lines on the first base are simultaneously between the orthographic projections of two adjacent columns of second pixel electrodes on the first base.

In some embodiments, the first gate line and the second gate line are disposed in a same layer and made from a same material; and the first data line and the second data line are disposed in a same layer and made from a same material.

In some embodiments, a plurality of first gate lines are disposed between two adjacent second gate lines; and/or a plurality of first data lines are disposed between two adjacent second data lines.

In some embodiments, the third substrate includes: a flexible base, and a first common electrode disposed on a side of the flexible base close to the second liquid crystal layer.

In some embodiments, the transparent electrode is a common electrode of the writing portion, and the third substrate includes: a flexible base, and a drive electrode disposed on a side of the flexible base close to the second liquid crystal layer.

In some embodiments, the drive electrode includes a planar electrode arranged on a whole layer or a plurality of block electrodes arranged in an array.

In some embodiments, an insulating layer is disposed between the first pixel electrode and the transparent electrode, and the first pixel electrode, the transparent electrode and the insulating layer are configured to form a storage capacitor.

In some embodiments, liquid crystal molecules in the second liquid crystal layer are bistable liquid crystal molecules;
wherein the bistable liquid crystal molecules in the second liquid crystal layer are configured to: transition from a focal conic texture to a planar texture after the third substrate is subjected to external pressure; and transition from the planar texture to the focal conic texture after an electric field is formed between the first substrate and the third substrate.

In some embodiments, the liquid crystal handwriting board further includes: a first polarizer and a transflective film, wherein the first liquid crystal layer is disposed between the first polarizer and the transflective film, and the transflective film is disposed on a side of the first liquid crystal layer away from the first substrate;
wherein the transflective film is configured to transmit first polarized light with a polarization direction parallel to a polarization direction of the first polarizer, and reflect second polarized light with a polarization direction perpendicular to the polarization direction of the first polarizer.

In some embodiments, the liquid crystal handwriting board further includes: a light absorbing layer disposed on a side of the transflective film away from the first liquid crystal layer.

In some embodiments, the light absorbing layer is a second polarizer or a black ink layer;
wherein the polarization direction of the first polarizer is perpendicular to a polarization direction of the second polarizer when the light absorbing layer is the second polarizer.

In some embodiments, the liquid crystal handwriting board further includes: a first polarizer, a third polarizer, and a reflective layer, wherein the first liquid crystal layer is disposed between the first polarizer and the third polarizer, the third polarizer is disposed on a side of the first liquid crystal layer away from the first substrate, and the reflective layer is disposed on a side of the third polarizer away from the first liquid crystal layer.

In some embodiments, the liquid crystal handwriting board further includes: a first polarizer, a third polarizer, and a backlight source, wherein the first liquid crystal layer is disposed between the first polarizer and the third polarizer, the third polarizer is disposed on a side of the first liquid crystal layer away from the first substrate, and the backlight source is disposed on a side of the third polarizer away from the first liquid crystal layer.

In some embodiments, the second substrate includes: a second base, a color resist layer disposed on a side of the second base close to the first substrate, and a planarization layer disposed on a side of the color resist layer away from the second base; and the first substrate further includes: a second common electrode; wherein
the second common electrode is disposed on a side of the first pixel electrode away from the first base, and the second common electrode is insulated from the first pixel electrode; the display portion is provided with a plurality of sub-pixel regions, one of the sub-pixel regions is provided with one of the first pixel electrodes, and a portion, disposed in one of the sub-pixel regions, of the second common electrode has at least one slit; or
the second common electrode is disposed between the first pixel electrode and the transparent electrode, the second common electrode is insulated from the first pixel electrode and is insulated from the transparent electrode, and the first pixel electrode has at least one slit.

In some embodiments, the second substrate includes: a second base, a color resist layer disposed on a side of the second base close to the first substrate, and a second common electrode disposed on a side of the color resist layer away from the second base.

In some embodiments, the first polarizer is disposed on a side of the first substrate; or
the first polarizer is disposed on a side of the third substrate.

In some embodiments of the present disclosure, a method for manufacturing a liquid crystal handwriting board is provided. The method includes:
forming a first substrate provided with a first pixel electrode and a transparent electrode;
forming a second substrate;
aligning the first substrate with the second substrate, and forming a first liquid crystal layer between the first substrate and the second substrate;
forming a third substrate; and
aligning the first substrate with the third substrate, and forming a second liquid crystal layer between the first substrate and the third substrate;
wherein the first substrate includes: a first base, and the first pixel electrode and the transparent electrode that are disposed on a side of the first base close to the second substrate, wherein the first pixel electrode is insulated from the transparent electrode, and the first pixel electrode is closer to the second substrate than the transparent electrode is;
wherein the first substrate, the first liquid crystal layer and the second substrate are configured to form a display portion of the liquid crystal handwriting board; and the first substrate, the second liquid crystal layer and the third substrate are configured to form a writing portion of the liquid crystal handwriting board

BRIEF DESCRIPTION OF DRAWINGS

For clearer descriptions of the technical solutions in the embodiments of the present disclosure, the following briefly describes the accompanying drawings required for describing the embodiments. The accompanying drawings in the following description show merely some embodiments of the present disclosure, and those of ordinary skill in the art may still derive other drawings from these accompanying drawings without creative effort.

DETAIL DESCRIPTION OF THE INVENTION

In order to make the objectives, technical solutions and advantages of the present disclosure clearer, the embodiments of the present disclosure will be described in detail below with reference to the accompanying drawings.

Liquid crystal handwriting panels have the advantages of low power consumption and clear handwritings, and are more and more widely used in recent years. However, currently, a liquid crystal handwriting board usually only has a writing function, which results in a single function of the liquid crystal handwriting board.

Figure 1:
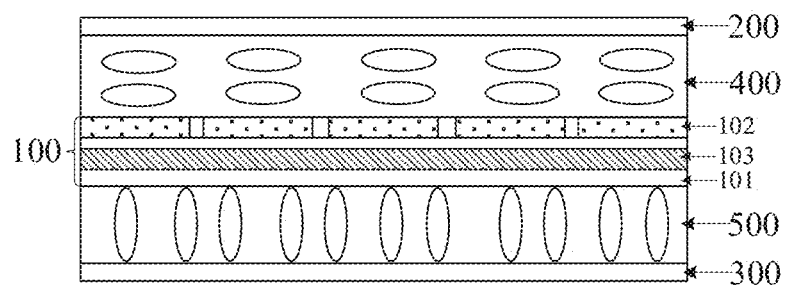
FIG. 1 is a schematic structural diagram of a liquid crystal handwriting board according to some embodiments of the present disclosure.

FIG. 1 is a schematic structural diagram of a liquid crystal handwriting board according to some embodiments of the present disclosure. Referring to FIG. 1, the liquid crystal handwriting board 000 includes a first substrate 100, a second substrate 200 disposed on a side of the first substrate 100, a third substrate 300 disposed on a side of the first substrate 100 away from the second substrate 200, a first liquid crystal layer 400 disposed between the first substrate 100 and the second substrate 200, and a second liquid crystal layer 500 disposed between the first substrate 100 and the third substrate 300.

The first substrate 100 includes a first base 101, and a first pixel electrode 102 and a transparent electrode 103 that are disposed on the side of the first base 101 close to the second substrate 200. The first pixel electrode 102 is insulated from the transparent electrode 103, and the first pixel electrode 102 is closer to the second substrate 200 than the transparent electrode 103 is. Here, the transparent electrode 103 is a planar electrode arranged on a whole layer, or is a strip electrode or a block electrode arranged on a whole layer, which is not limited in the present disclosure.

The first substrate 100, the first liquid crystal layer 400 and the second substrate 200 are configured to form a display portion of the liquid crystal handwriting board 000; and the first substrate 100, the second liquid crystal layer 500 and the third substrate 300 are configured to form a writing portion of the liquid crystal handwriting board 000.

In the embodiments of the present disclosure, in the display portion of the liquid crystal handwriting board 000, the liquid crystal handwriting board 000 applies a first pixel voltage to the first pixel electrode 102, so that an electric field is formed between the first substrate 100 and the second substrate 200. Under the action of the electric field force, the liquid crystal molecules in the first liquid crystal layer 400 are deflected, so that the display portion of the liquid crystal handwriting board 000 can display a picture.

In the writing portion of the liquid crystal handwriting board 000, the liquid crystal molecules in the second liquid crystal layer 500 are bistable liquid crystal molecules. The bistable liquid crystal molecules in the second liquid crystal layer 500 are configured to transition from a focal conic texture to a planar texture after the third substrate 300 is subjected to external pressure.

In this case, when the writing portion of the liquid crystal handwriting board 000 is in a writing mode, a user can apply pressure to the third substrate 300, so that the bistable liquid crystal molecules in the second liquid crystal layer 500 in the writing portion of the liquid crystal handwriting board 000 transition from the focal conic texture to the planar texture under the action of the external pressure. As such, the liquid crystal molecules transitioned into the planar texture reflect light of a particular wavelength (for example, green light) in the incident ambient light, such that the writing portion of the liquid crystal handwriting board 000 displays handwritings.

In the embodiments of present disclosure, the transparent electrode 103 in the first substrate 100 serves as a shield electrode, and the display portion and the writing portion of the liquid crystal handwriting board 000 are shielded by the shield electrode, to prevent the display portion and the writing portion of the liquid crystal handwriting board 000 from mutual interference during operation. The transparent electrode 103 in the first substrate 100 also serves as a common electrode of the writing portion of the liquid crystal handwriting board 000, and the common electrode and the first pixel electrode 102 in the display portion form a storage capacitor, so that the display portion has a better display effect. In this way, by providing the transparent electrode 103, it's ensured that the liquid crystal handwriting board has a high reliability.

In summary, the embodiments of the present disclosure provide a liquid crystal handwriting board, including a first substrate, a second substrate disposed on a side of the first substrate, a third substrate disposed on the other side of the first substrate, a first liquid crystal layer disposed between the first substrate and the second substrate, and a second liquid crystal layer disposed between the first substrate and the third substrate. Since the first substrate, the first liquid crystal layer and the second substrate form the display portion of the liquid crystal handwriting board, the liquid crystal molecules in the first liquid crystal layer are deflected under the action of the electric field force formed between the first substrate and the first liquid crystal layer, so that the liquid crystal handwriting board can display a picture. In addition, since the first substrate, the second liquid crystal layer and the third substrate form the writing portion of the liquid crystal handwriting board, the liquid crystal molecules in the second liquid crystal layer transition from the focal conic texture to the planar texture after the third substrate is subjected to external pressure, and the liquid crystal molecules transitioned into the planar texture reflect light of a particular wavelength in the incident ambient light, such that the writing portion of the liquid crystal handwriting board can display handwritings. Therefore, the liquid crystal handwriting board in the present disclosure can not only display handwritings through the writing portion, but also display the picture through the display portion. Therefore, the liquid crystal handwriting board in the present disclosure have a writing function and a display function at the same time, which effectively enriches the function of the liquid crystal handwriting board.

In the embodiments of present disclosure, the bistable liquid crystal molecules in the second liquid crystal layer 500 are further configured to transition from the planar texture to the focal conic texture after an electric field is formed between the first substrate 100 and the third substrate 300. As such, the writing portion of the liquid crystal handwriting board 000 can also erase the handwritings displayed thereon. Exemplarily, when the writing portion of the liquid crystal handwriting board 000 is in the erasing mode, after the electric field is formed between the first substrate 100 and the third substrate 300, the bistable liquid crystal molecules between the first substrate 100 and the third substrate 300 are rearranged under the action of the electric field force. That is, the bistable liquid crystal molecules transition from the planar texture to the focal conic texture. In this way, the liquid crystal molecules transitioned into the focal conic texture can transmit the incident ambient light, and the handwritings in the to-be-erased region are erased.

In order to form an electric field normally between the first substrate 100 and the third substrate 300, corresponding electrodes need to be disposed on the first substrate 100 and the third substrate 300 respectively. There are a plurality of manners for disposing the electrodes on the first substrate 100 and the third substrate 300 respectively, and the embodiments of the present disclosure are illustratively described by taking the following two optional implementations as examples.

Figure 2:
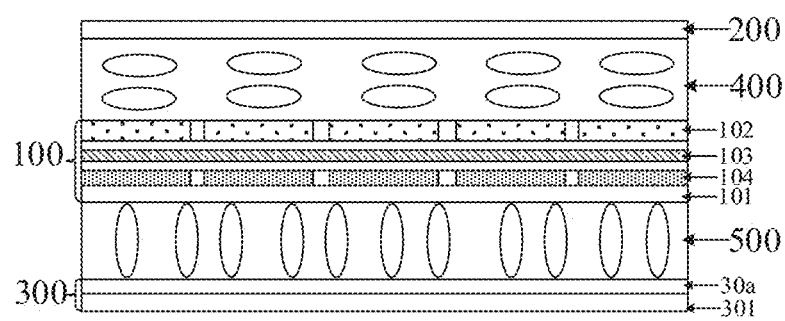
FIG. 2 is a schematic structural diagram of another liquid crystal handwriting board according to some embodiments of the present disclosure.

In a first optional implementation, when the transparent electrode 103 in the first substrate 100 is not used as an electrode for forming an electric field in the writing portion of the liquid crystal handwriting board, please refer to FIG. 2, and FIG. 2 is a schematic structural diagram of another liquid crystal handwriting board according to some embodiments of the present disclosure. The first substrate 100 further includes a second pixel electrode 104 disposed on the side of the transparent electrode 103 close to the first base 101. The second pixel electrode 104 is insulated from the transparent electrode 103. The third substrate 300 includes a flexible base 301, and a first common electrode 30a disposed on the side of the flexible base 301 close to the second liquid crystal layer 500.

In this case, the writing portion of the liquid crystal handwriting board 000 apples a second pixel voltage to the second pixel electrode 104 in the to-be-erased region, and a voltage difference is formed between the second pixel electrode 104 and the first common electrode 30a, so that the liquid crystal molecules in the to-be-erased region are rearranged under the action of the electric field force. That is, the liquid crystal molecules transition from the planar texture to the focal conic texture. In this way, the liquid crystal molecules transitioned into the focal conic texture can transmit the incident ambient light, and the handwritings in the to-be-erased region are erased.

It should be noted that, when the writing portion of the liquid crystal handwriting board 000 is in the erasing mode, the handwritings in the to-be-erased region of the liquid crystal handwriting board 000 can be erased by means of infrared positioning or optical erasing.

For example, in the case that the writing portion of the liquid crystal handwriting board 000 erases the writing handwriting by means of infrared positioning, an infrared positioning device needs to be integrated on the side of the third substrate 300 away from the first substrate 100, and the infrared positioning device is used to determine the position of the erasing tool (for example, a board eraser) on the liquid crystal handwriting board 000, so as to determine the position information of the to-be-erased region. Then, the liquid crystal handwriting board 000 applies the second pixel voltage to the second pixel electrode 104 in the to-be-erased region.

In the case that the writing portion of the liquid crystal handwriting board 000 erases the writing handwriting by means of optical erasing, the liquid crystal handwriting board 000 is irradiated by using an erasing tool capable of emitting target light (for example, white light with a light intensity stronger than the light intensity of ambient light). Here, the region irradiated by the target light in the liquid crystal handwriting board 000 is the to-be-erased region, and the liquid crystal handwriting board 000 applies the second pixel voltage to the second pixel electrode 104 in the to-be-erased region.

In the embodiments of the present disclosure, in the first substrate 100, the transparent electrode 103 disposed between the first pixel electrode 102 and the second pixel electrode 104 is a shield electrode. Here, the shield electrode is electrically connected to the ground terminal of the liquid crystal handwriting board 000. In this way, through the shield electrode between the first pixel electrode 102 and the second pixel electrode 104, the liquid crystal handwriting board 000 can prevent the second pixel voltage applied on the second pixel electrode 104 from affecting the liquid crystal molecules in the first liquid crystal layer 400, and can prevent the first pixel voltage applied on the first pixel electrode 102 from affecting the liquid crystal molecules in the second liquid crystal layer 500. In this way, the display portion and the writing portion of the liquid crystal handwriting board 000 do not interfere with each other during operation.

Figure 3:
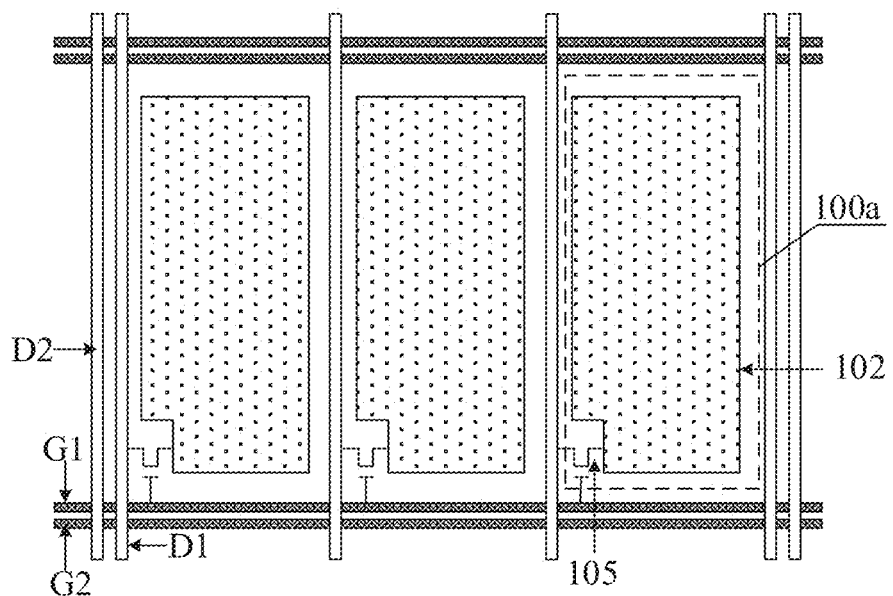
FIG. 3 is a partial top view of a first pixel electrode according to some embodiments of the present disclosure.
Figure 4:
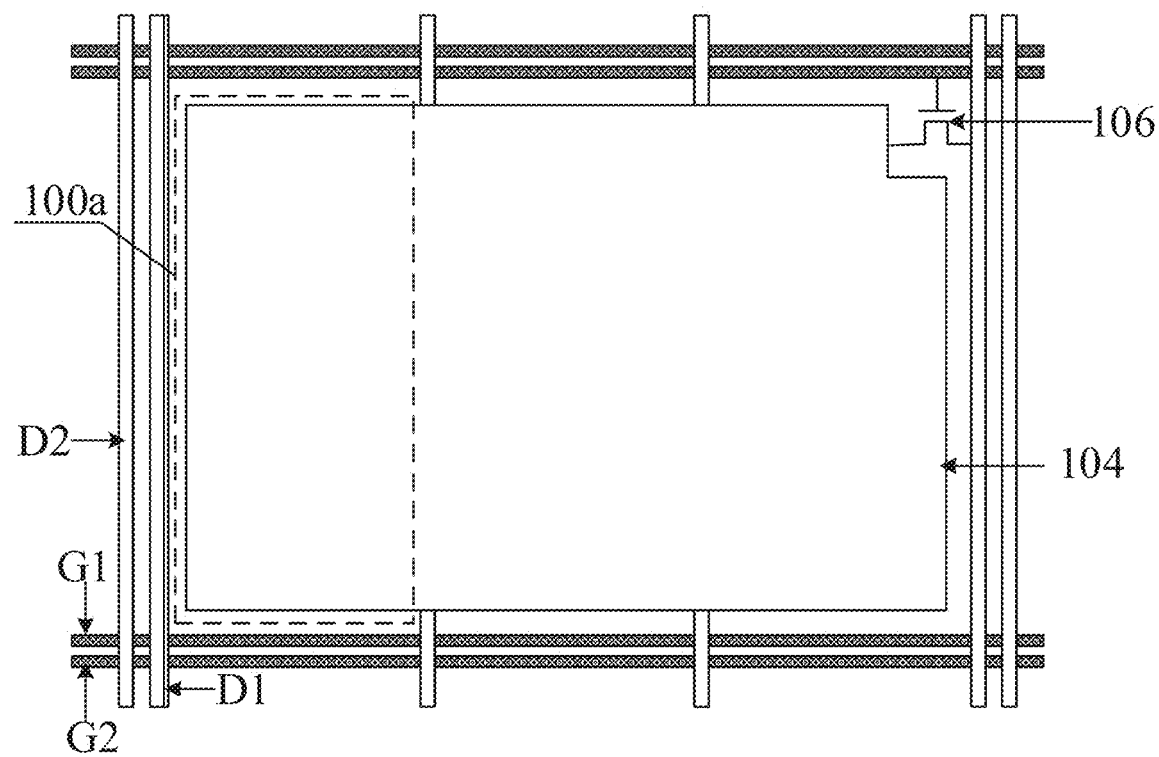
FIG. 4 is a partial bottom view of a second pixel electrode according to some embodiments of the present disclosure.
Figure 5:
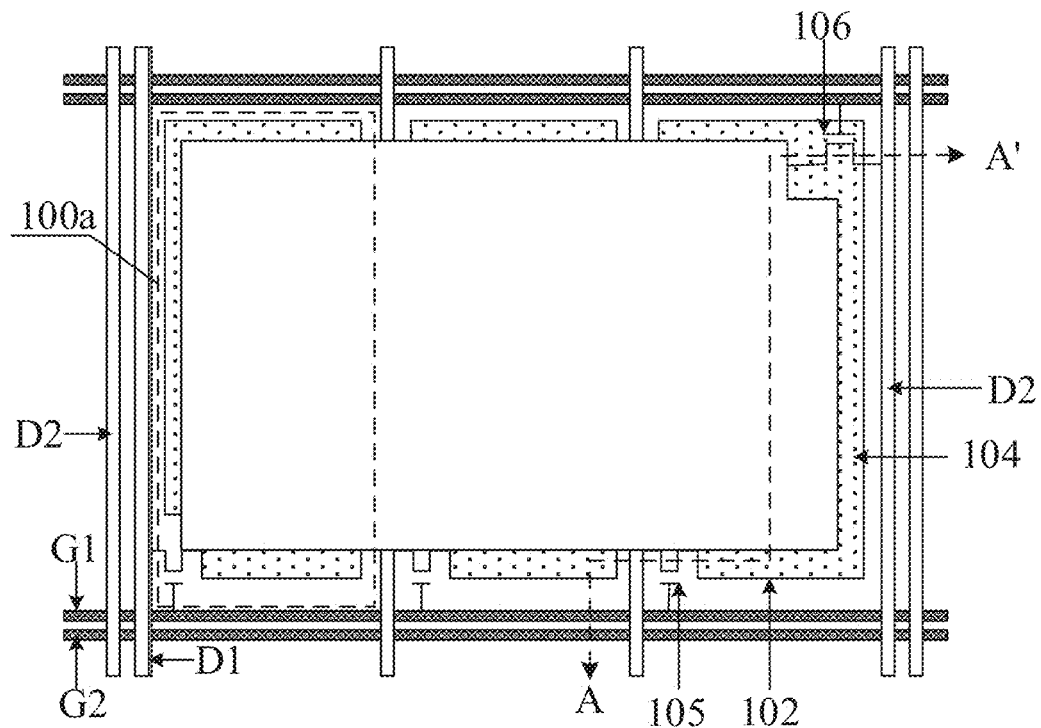
FIG. 5 is a top view of the superposed first pixel electrode and second pixel electrode shown in FIG. 3 and FIG. 4.

In the embodiments of the present disclosure, please refer to FIG. 3, FIG. 4 and FIG. 5. FIG. 3 is a partial top view of a first pixel electrode according to some embodiments of the present disclosure, FIG. 4 is a partial bottom view of a second pixel electrode according to some embodiments of the present disclosure, and FIG. 5 is a top view of the superposed first pixel electrode and second pixel electrode shown in FIG. 3 and FIG. 4. A plurality of first pixel electrodes 102 and a plurality of second pixel electrodes 104 are provided. Here, the plurality of first pixel electrodes 102 are arranged in an array in the first substrate 100, and the plurality of second pixel electrodes 104 are also arranged in an array in the first substrate 100. One of the second pixel electrodes 104 corresponds to at least one first pixel electrode 102, and the orthographic projection of the first pixel electrode 102 on the first base 101 is within the orthographic projection of the corresponding second pixel electrode 104 on the first base 101.

In the present disclosure, as shown in FIG. 4, the display portion of the liquid crystal handwriting board 000 includes a plurality of sub-pixel regions 100a arranged in an array. The plurality of sub-pixel regions 100a are in one-to-one correspondence with the plurality of first pixel electrodes 102. For example, one corresponding first pixel electrode 102 is arranged in each sub-pixel region 100a.

In this case, one second pixel electrode 104 corresponds to at least one sub-pixel region 100a. The handwriting wrote by a user on the liquid crystal handwriting board 000 is generally wide, and the width of the sub-pixel area 100a is generally small. Therefore, in order to improve the efficiency of erasing the handwritings, it is necessary to ensure that each second pixel electrode 104 corresponds to a plurality of sub-pixel regions 100a. For example, each second pixel electrode 104 corresponds to three sub-pixel regions 100a, and the three pixel regions 101a are arranged in one row or one column. The orthographic projection of each of the three first pixel electrodes 102 arranged in the three sub-pixel regions 100a on the second pixel electrode 104 is within the region of the corresponding second pixel electrode 104.

In this way, the three sub-pixel regions 100a form a minimum erase region. If the handwritings exit in any one of the three sub-pixel regions 100a, the three sub-pixel regions 100a are determined as the to-be-erased region, and the three sub-pixel regions 100a are controlled by the corresponding second pixel electrodes 104, such that the handwritings displayed in the minimum erase region formed of the three sub-pixel regions 100a are erased. It should be noted that each second pixel electrode 104 may also correspond to more sub-pixel regions 100a, which is not limited in the present disclosure.

Figure 6:
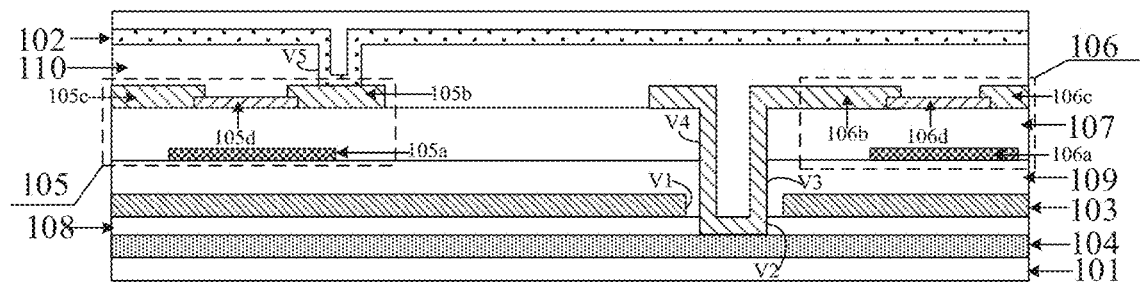
FIG. 6 is a schematic sectional view taken along A-A' of FIG. 5.

In the embodiments of the present disclosure, FIG. 6 is a schematic sectional view taken along A-A' of FIG. 5. Referring to FIG. 6, the first substrate 100 further includes a first thin film transistor 105 electrically connected to the first pixel electrode 102, and a second thin film transistor 106 electrically connected to the second pixel electrode 104. The first thin film transistor 105 and the second thin film transistor 106 are disposed in a same layer. In this way, in the process of manufacturing the first substrate 100, the first thin film transistor 105 and the second thin film transistor 106 are formed simultaneously, which effectively simplifies the process of manufacturing the first substrate 100.

For example, the first thin film transistor 105 includes a gate 105a, a first electrode 105b, a second electrode 105c and an active layer 105d. The first electrode 105b and the second electrode 105c are lapped on the active layer 105d, and the active layer 105d is insulated from the gate 105a. For example, the active layer 105d and the gate 105a are insulated by a gate insulating layer 107. It should be noted that the first electrode 105b of the first thin film transistor 105 is one of a source and a drain, and the second electrode 105c is the other one of the source and the drain. Similarly, the second thin film transistor 106 also includes a gate 106a, a first electrode 106b, a second electrode 106c and an active layer 106d. For the relationship between the internal structures of the second thin film transistor 106, please refer to the relationship between the internal structures of the first thin film transistor 105, and details are not repeated here.

In this case, the gate 105a of the first thin film transistor 105 and the gate 106a of the second thin film transistor 106 are formed by a one-time patterning process. The first electrode 105b and the second electrode 105c of the first thin film transistor 105 and the first electrode 106b and the second electrode 106c of the second thin film transistor 106 are formed by a one-time patterning process. The active layer 105d of the first thin film transistor 105 and the active layer 106d of the second thin film transistor 106 are formed by a one-time patterning process. It should be noted that the one-time patterning process in the embodiments of the present disclosure refers to photoresist coating, exposure, development, etching and photoresist stripping.

In the embodiment of the present disclosure, as shown in FIG. 5 and FIG. 6, the first substrate 100 further includes a plurality of first gate lines G1 and a plurality of first data lines D1 that are electrically connected to a plurality of first thin film transistors 105, and a plurality of second gate lines G2 and a plurality of second data lines D2 that are electrically connected to a plurality of second thin film transistors 106. The liquid crystal handwriting board 000 applies a voltage to each of the first thin film transistors 105 through the plurality of first gate lines G1 and the plurality of first data lines D1, such that the first pixel voltage is applied to the first pixel electrodes 102 corresponding to the first thin film transistors 105. The liquid crystal handwriting board 000 also applies a voltage to each of the second thin film transistors 106 through the plurality of second gate lines G2 and the plurality of second data lines D2, such that the second pixel voltage is applied to the second pixel electrodes 104 corresponding to the second thin film transistors 106.

In the present disclosure, the orthographic projection of one first gate line G1 on the first base 101 is between the orthographic projections of two adjacent rows of first pixel electrodes 102 on the first base 101; and the orthographic projection of one first data line D1 on the first base 101 is between the orthographic projections of two adjacent columns of first pixel electrodes 102 on the first base 101. The orthographic projection of one second gate line G2 on the first base 101 is between the orthographic projections of two adjacent rows of second pixel electrodes 104 on the first base 101; and the orthographic projection of one second data line D1 on the first base 101 is between the orthographic projections of two adjacent columns of second pixel electrodes 104 on the first base 101.

The first electrode 105b of the first thin film transistor 105 is electrically connected to the first pixel electrode 102, the second electrode 105c of the first thin film transistor 105 is electrically connected to the first data line D1, and the gate 105a of the first thin film transistor 105 is electrically connected to the first gate line G1. The first electrode 106b of the second thin film transistor 106 is electrically connected to the second pixel electrode 104, the second electrode 106c of the second thin film transistor 106 is electrically connected to the second data line D2, and the gate 106a of the second thin film transistor 106 is electrically connected to the second gate line G2.

In the embodiments of the present disclosure, the orthographic projection of one first gate line G1 on the first base 101 and the orthographic projection of one second gate line G2 on the first base 101 are between the orthographic projections of two adjacent rows of second pixel electrodes 104 on the first base 101 simultaneously; and the orthographic projection of one first data line D1 on the first base 101 and the orthographic projection of one second data line D2 on the first base 101 are between the orthographic projections of two adjacent columns of second pixel electrodes 104 on the first base 101 simultaneously. In this case, the orthographic projections of the first gate line G1, the second gate line G2, the first data line D1, and the second data line D2 on the first base 101 do not coincide with the orthographic projection of the first pixel electrode 102 on the first base 101, such that no parasitic capacitance is generated between the signal line in the liquid crystal handwriting board 000 and the first pixel electrode. Therefore, the display of the display portion of the liquid crystal handwriting board 000 is not affected. Here, the extending direction of the first gate line G1 is parallel to the extending direction of the second gate line G2, and the extending direction of the first data line D1 is parallel to the extending direction of the second data line D2. The extending direction of the first data line D1 is perpendicular to the extending direction of the first gate line G1.

In this case, the liquid crystal handwriting board 000 applies the first pixel voltage to the first pixel electrode 102 through the first data line D1 and the first gate line G1, such that the liquid crystal handwriting board 000 controls the display portion of the liquid crystal handwriting board 000 to display the picture. The liquid crystal handwriting board 000 applies the second pixel voltage to the second pixel electrode 104 through the second data line D2 and the second gate line G2, such that the liquid crystal handwriting board 000 controls the writing portion of the liquid crystal handwriting board 000 to erase the handwritings.

In the embodiments of the present disclosure, in order to simplify the process of manufacturing the liquid crystal handwriting board 000, the first gate line G1 and the second gate line G2 are disposed in the same layer and made from the same material. That is, the first gate line G1 and the second gate line G2 are formed by the one-time patterning process. For example, the first gate line G1, the second gate line G2, the gate 105a of the first thin film transistor 105, and the gate 106a of the second thin film transistor 106 are formed by the one-time patterning process. The first data line D1 and the second data line D2 are disposed in the same layer and made from the same material. That is, the first data line D1 and the second data line D2 are formed by the one-time patterning process. For example, the first data line D1, the second data line D2, the first electrode 105b of the first thin film transistor 105, and the first electrode 106b of the second thin film transistor 106 are formed by the one-time patterning process.

In the present disclosure, a plurality of first gate lines G1 are arranged between two adjacent second gate lines G2, and/or a plurality of first data lines D1 are arranged between two adjacent second data lines D2. Here, two or more first gate lines G1 are arranged between two adjacent second gate lines G2, and two or more first data lines D1 are arranged between two adjacent second data lines D2. In the embodiments of the present disclosure, one second pixel electrode 104 corresponds to a plurality of first pixel electrodes 102. Therefore, the numbers of second gate lines G2 and second data lines D2 for applying the second pixel voltage to the plurality of second pixel electrodes 104 are respectively less than the numbers of the first gate lines G1 and first data lines D1 for applying the first pixel voltage to the plurality of first pixel electrodes 102, which can effectively simplify the difficulty of manufacturing the liquid crystal handwriting board 000.

It should be noted that the plurality of sub-pixel regions 100a in the above embodiments are enclosed by a plurality of first data lines D1 and a plurality of first gate lines G1. For example, any two adjacent first gate lines G1 and any two adjacent first data lines D1 enclose one sub-pixel region 100a.

In the embodiments of the present disclosure, as shown in FIG. 6, the second thin film transistor 106 is disposed between the first pixel electrode 102 and the transparent electrode 103. The transparent electrode 103 is provided with a first via hole V1, and the first electrode 106b of the second thin film transistor 106 passes through the first via hole V1 to be electrically connected to the second pixel electrode 104. In this way, the short circuit is avoided between the transparent electrode 103 and the first electrode 106b of the second thin film transistor 106 while it's ensured that the first thin film transistor 105 and the second thin film transistor 106 are disposed in the same layer.

In the present disclosure, the first substrate 100 further includes a first insulating layer 108 disposed between the second pixel electrode 104 and the transparent electrode 103, and a second insulating layer 109 disposed between the second thin film transistor 106 and the transparent electrode 103. For example, the first insulating layer 108 prevents the short circuit from occurring between the second pixel electrode 104 and the transparent electrode 103, and the second insulating layer 109 prevents the short circuit from occurring between the second thin film transistor 106 and the transparent electrode 103.

The first insulating layer 108 is provided with a second via hole V2 in communication with the first via hole V1, and the second insulating layer 109 is provided with a third via hole V3 in communication with the first via hole V1. Here, the orthographic projection of the second via hole V2 on the first base 101 and the orthographic projection of the third via hole V3 on the first base 101 are both within the orthographic projection of the first via hole V1 on the first base 101, and the first electrode 106b of the second thin film transistor 106 sequentially passes through the third via hole V3, the first via hole V1, and the second via hole V2 to be electrically connected to the second pixel electrode 104.

In this case, the first via hole V1 is larger than the second via hole V2 and the third via hole V3, such that the first electrode 106b of the second thin film transistor 106 is not in contact with the transparent electrode 103, which prevents short circuit from occurring between the first electrode 106b of the second thin film transistor 106 and the transparent electrode 103. In this way, the first electrode 106b of the second thin film transistor 106 sequentially passes through the gate insulating layer 107, the third via hole V3 in the second insulating layer 109, the first via hole V1 in the transparent electrode 103, and the second via hole V2 in the first insulating layer 108 to be electrically connected to the second pixel electrode 104. Here, the orthographic projection of the third via hole V3 in the second insulating layer 109 on the first base 101 coincides with the orthographic projection of the second via hole V2 in the first insulating layer 108 on the first base 101, such that the first electrode 106b of the second thin film transistor 106 is well lapped on the second pixel electrode 104.

It should be noted that the gate insulating layer 107 is provided with a fourth via hole V4 which is in communication with the third via hole V3 and has the same shape as the third via hole V3. The first electrode 106b of the second thin film transistor 106 sequentially passes through the fourth via hole V4, the third via hole V3, the first via hole V1 and the second via hole V2 to be electrically connected to the second pixel electrode 104. In this way, the first electrode 106b of the second thin film transistor 106 sequentially penetrates through the gate insulating layer 107, the second insulating layer 109, the transparent electrode 103 and the first insulating layer 108 to be electrically connected to the second pixel electrode 104.

In the embodiments of the present disclosure, the first substrate 100 further includes a third insulating layer 110 disposed between the first pixel electrode 102 and the transparent electrode 103. For example, the third insulating layer 110 prevent the short circuit from occurring between the first pixel electrode 102 and the transparent electrode 103.

The third insulating layer 110 is provided with a fifth via hole V5, and the second pixel electrode 102 passes through the fifth via hole V5 to be electrically connected to the first electrode 105b of the first thin film transistor 105.

It should be noted that the base in the third substrate 300 is a flexible base 301, and the first base 101 in the first substrate 100 is a rigid base. Therefore, when the transparent electrode 103 is not used as an electrode for forming an electric field in the writing portion of the liquid crystal handwriting board 000, only the first common electrode 30a needs to be formed on the flexible base 301, and the first thin film transistor 105, the second thin film transistor 106, the first pixel electrode 102, the transparent electrode 103 and the second pixel electrode 104 are all formed on the rigid base. In this way, there are few structures formed on the flexible base 301 in the third substrate 300, and the manufacturing difficulty of the third substrate 300 is reduced, which helps reduce the difficulty of manufacturing the liquid crystal handwriting board 000.

Figure 7:
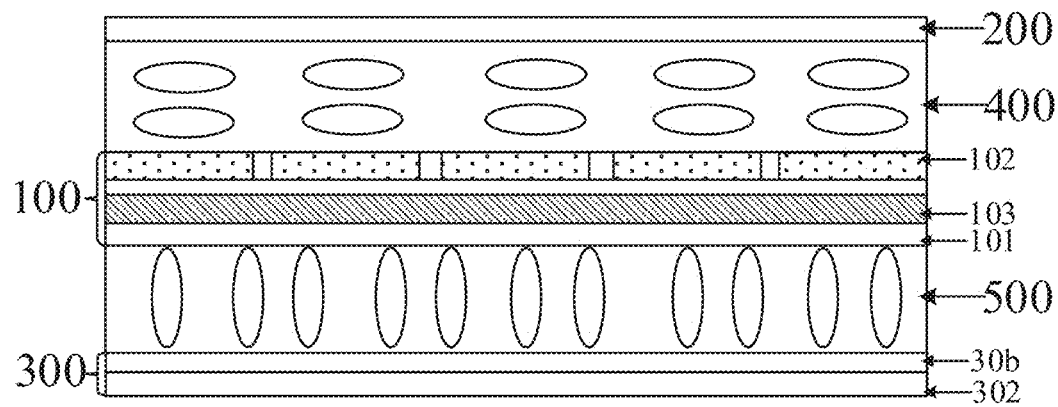
FIG. 7 is a schematic structural diagram of still another liquid crystal handwriting board according to some embodiments of the present disclosure.

In a second optional implementation, when the transparent electrode 103 in the first substrate 100 is used as an electrode for forming an electric field in the writing portion of the liquid crystal handwriting board, please refer to FIG. 7. FIG. 7 is a schematic structural diagram of still another liquid crystal handwriting board according to some embodiments of the present disclosure. The transparent electrode 103 is a common electrode of the writing portion of the liquid crystal handwriting board. For example, the common electrode of the writing portion refers to an electrode that loads a common voltage. The third substrate 300 includes a flexible base 302, and a drive electrode 30b disposed on the side of the flexible base 302 close to the second liquid crystal layer 500. In this way, the writing portion of the liquid crystal handwriting board 000 applies a voltage to the drive electrode 30b to generate a voltage difference between the drive electrode 30b and the transparent electrode 103, such that the liquid crystal molecules in the liquid crystal handwriting board 000 are rearranged under the action of the electric field force, that is, the liquid crystal molecules transition from the planar texture to the focal conic texture. In this way, the liquid crystal molecules transitioned into the focal conic texture transmit the incident ambient light, and the handwritings in the liquid crystal handwriting board 000 are erased.

In the embodiments of the present disclosure, the transparent electrode 103 is a planar electrode on a whole layer, and the drive electrode 30b includes a planar electrode arranged on a whole layer or a plurality of block electrodes arranged in an array. The manner of forming the electric field in the writing portion of the liquid crystal handwriting board 000 includes an active driving manner and a passive driving manner, and the embodiments of the present disclosure are illustratively described in the following two situations.

In the first situation, when the electric field is formed in the passive driving manner in the writing portion of the liquid crystal handwriting board 000, the drive electrode 30b includes one planar electrode, that is, the drive electrode 30b is also a planar electrode on a whole layer. In this situation, the writing portion of the liquid crystal handwriting board 000 is entirely erased during erasing. For example, when the writing portion of the liquid crystal handwriting board 000 is in the erasing mode, the user can turn on the erase switch such that the voltage is applied to the drive electrode 30b in the third substrate 300. As such, the voltage difference is generated between the drive electrode 30b and the common electrode, and thus all liquid crystal molecules in the liquid crystal handwriting board 000 are rearranged under the action of the electric field force, that is, the liquid crystal molecules transition from the planar texture to the focal conic texture. In this way, all handwritings presented on the liquid crystal handwriting board 000 are erased.

In the second situation, when the electric field is formed in the active driving manner in the writing portion of the liquid crystal handwriting board 000, the drive electrode 30b includes a plurality of block electrodes arranged in an array, and the third substrate 300 further includes thin film transistors electrically connected to the plurality of block electrodes in one-to-one correspondence. The pixel voltage is applied to the drive electrode 30b by controlling the thin film transistor, such that the voltage difference is generated between the drive electrode 30b and the transparent electrode 103, thereby erasing the handwritings presented on the liquid crystal handwriting board 000. It should be noted that reference may be made to the corresponding content in the first optional implementation for the erasing principle in this situation, and details are not described herein again.

In the present disclosure, when the transparent electrode 103 is used as the common electrode of the writing portion of the liquid crystal handwriting board 000, a fixed and relatively low common voltage needs to be applied thereon.

Since the potential of the common voltage applied to the transparent electrode 103 is low, the pixel voltage applied to the first pixel electrode 102 is not affected. Therefore, the writing portion of the liquid crystal handwriting board does not affect the normal operation of the display portion.

Figure 8:
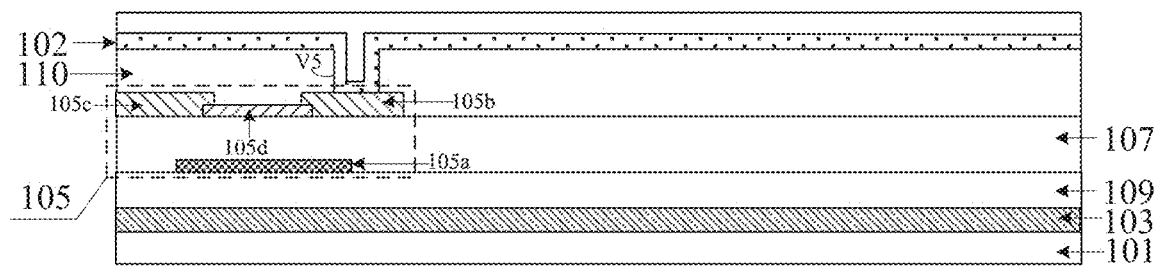
FIG. 8 is a schematic structural diagram of film layers of a first substrate in the liquid crystal handwriting board shown in FIG. 7.

In the embodiments of the present disclosure, referring to FIG. 8, and FIG. 8 is a schematic structural diagram of film layers of the first substrate in the liquid crystal handwriting board shown in FIG. 7. An insulating layer is disposed between the first pixel electrode 102 and the transparent electrode 103, and the first pixel electrode 102, the transparent electrode 103 and the insulating layer are configured to form a storage capacitor. Here, the storage capacitor is configured to maintain the voltage of the first pixel electrode 102. Therefore, when the display portion of the liquid crystal handwriting board 000 displays, the storage capacitor can prevent the voltage of the first pixel electrode 102 in the sub-pixel region 100a performing display in the display portion of the liquid crystal handwriting board 000 from changing, which effectively improves the display effect of the display portion of the liquid crystal handwriting board 000.

It should be noted that the film layer structure of the first substrate 100 shown in FIG. 8 is substantially the same as the film layer structure of the first substrate 100 shown in FIG. 6, and the difference lies in that the first substrate 100 shown in FIG. 6 includes the second thin film transistor 106 and the second pixel electrode 104, while the first substrate 100 shown in FIG. 8 does not include the second thin film transistor 106 and the second pixel electrode 104. Therefore, for the film layer structure of the first substrate 100 shown in FIG. 8, please refer to the film layer structure of the first substrate 100 in FIG. 6, and details are not described herein again. In this case, the insulating layer between the first pixel electrode 102 and the transparent electrode 103 includes the third insulating layer 110, the gate insulating layer 107, and the second insulating layer 109.

It should be further noted that, in the above two optional implementations, the flexible base (301, 302) in the third substrate 300 is made from a flexible material such as polyethylene terephthalate (PET). As such, the user can apply pressure to the third substrate 300, such that the liquid crystal handwriting board 000 presents handwritings.

In the embodiments of the present disclosure, the display portion of the liquid crystal handwriting board 000 is in a plurality of structures, and the embodiments of the present disclosure are illustratively described by taking the following three exemplary implementations as examples.

Figure 9:
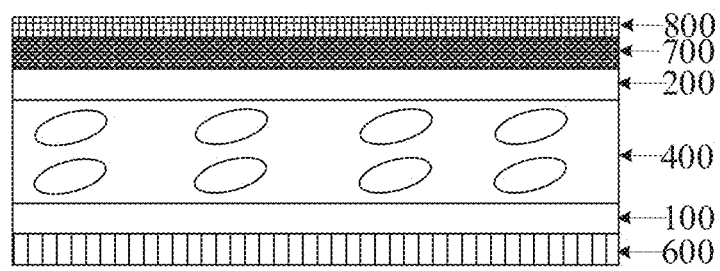
FIG. 9 is a schematic structural diagram of a display portion of a liquid crystal handwriting board according to some embodiments of the present disclosure.

In the first exemplary implementation, please refer to FIG. 9, and FIG. 9 is a schematic structural diagram of a display portion of a liquid crystal handwriting board according to some embodiments of the present disclosure. The liquid crystal handwriting board 000 further includes a first polarizer 600 and a transflective film 700. The first liquid crystal layer 400 is disposed between the first polarizer 600 and the transflective film 700, and the transflective film 700 is disposed on the side of the first liquid crystal layer 400 away from the first substrate 100. For example, the transflective film 700 is disposed on the side of the second substrate 200 away from the first liquid crystal layer 400. Here, the first polarizer 600 transmits polarized light with a polarization direction same as the polarization direction of the first polarizer 600. In this way, in in the ambient light transmitted to the first polarizer 600, the polarized light with the polarization direction same as the polarization direction of the first polarizer 600 passes through the first polarizer 600 and is transmitted to the first liquid crystal layer 400, while the light with the polarization direction different from the polarization direction of the first polarizer 600 is absorbed by the first polarizer 600.

The transflective film 700 is an advanced polarizer film (APF), which is a layered film capable of transmitting light having one polarization direction and reflecting light having another polarization direction. For example, the transflective film 700 is configured to transmit first polarized light L1 with a polarization direction parallel to the polarization direction of the first polarizer 600, and reflect second polarized light L2 with a polarization direction perpendicular to the polarization direction of the first polarizer L1. In this way, after the ambient light is transmitted to the first polarizer 600, the polarized light passing through the first polarizer 600 is the first polarized light L1. Then, the first polarized light L1 is transmitted to the first liquid crystal layer 400. If the polarization direction of the first polarized light L1 is not changed after the first polarized light L1 passes through the first liquid crystal layer 400, the first polarized light L1 passing through the first liquid crystal layer 400 is transmitted from the transflective film 700. If the polarization direction of the first polarized light L1 is changed after the first polarized light L1 passes through the first liquid crystal layer 400, for example, the first polarized light L1 is converted into the second polarized light L2 after passing through the first liquid crystal layer 400, the second polarized light L2 is reflected out of the liquid crystal handwriting board 000 by the transflective film 700, and the display portion of the liquid crystal handwriting board 000 displays a picture based on the reflected ambient light.

In the embodiments of the present disclosure, as shown in FIG. 9, the liquid crystal handwriting board 000 further includes a light absorbing layer 800 disposed on the side of the transflective film 700 away from the first liquid crystal layer 400. Here, the light absorbing layer 800 absorbs all the light transmitted from the transflective film 700 in the liquid crystal handwriting board 000. In this case, by disposing the light absorbing layer 800, not only the display effect of the display picture presented on the display portion of the liquid crystal handwriting board 000 is better, but also the writing portion of the liquid crystal handwriting board 000 presents a black background, such that the display effect of the handwritings displayed on the writing portion is better.

For example, the light absorbing layer 800 is a second polarizer or a black ink layer. In the case that the light absorbing layer 800 is the black ink layer, the black ink absorbs the polarized light transmitted to the light absorbing layer 800 better.

In the case that the light absorbing layer 800 is the second polarizer, the polarization direction of the first polarizer 600 is perpendicular to the polarization direction of the second polarizer. In this way, the polarized light transmitted through the transflective film 700 is absorbed by the second polarizer perpendicular to the polarization direction of the polarized light. For example, after the first polarized light L1 is transmitted through the transflective film 700, as the polarization direction of the second polarizer is perpendicular to the polarization direction of the first polarized light L1, the second polarizer absorbs the first polarized light L1 transmitted through the transflective film 700.

In the present disclosure, there are two display modes based on whether the first pixel electrode 102 in the display portion of the liquid crystal handwriting board 000 and the common electrode are in the same substrate. For example, in the case that the first pixel electrode 102 and the common electrode are in the same substrate, the display principle of the display portion of the liquid crystal handwriting board 000 is the first display principle in the following embodiments, and this display principle is referred to as an ADS display principle. In the case that the first pixel electrode 102 and the common electrode are not in the same substrate, the display principle of the display portion of the liquid crystal handwriting board 000 is the second display principle in the following embodiments, and this display principle is referred to as a TN display principle. The embodiments of the present disclosure are illustratively described by taking the following two display principles as examples.

Figure 10:
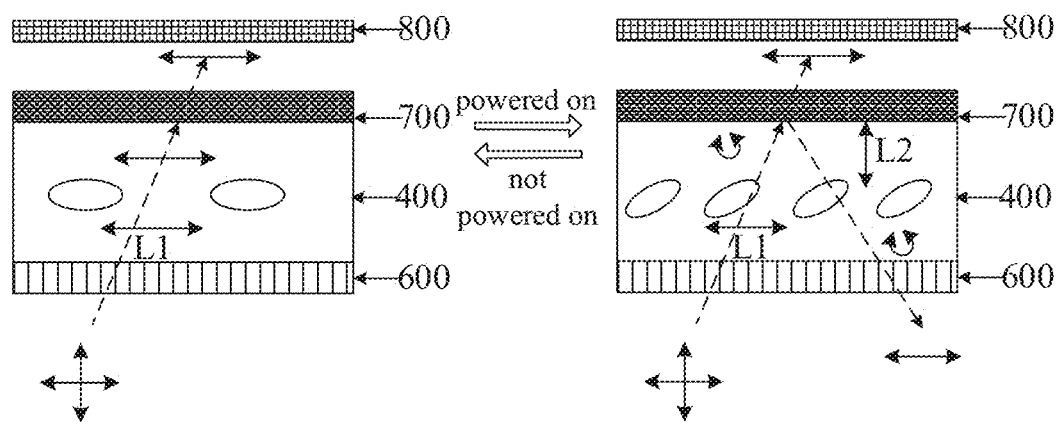
FIG. 10 is a schematic diagram showing a display principle of the display portion of the liquid crystal handwriting board shown in FIG. 9 according to some embodiments of the present disclosure.

Referring to FIG. 10, FIG. 10 is a schematic diagram showing a display principle of the display portion of the liquid crystal handwriting board shown in FIG. 9 according to some embodiments of the present disclosure. In the case that no electric field is formed in the display portion of the liquid crystal handwriting board 000, that is, the display portion of the liquid crystal handwriting board 000 is not powered on, the display portion of the liquid crystal handwriting board 000 completely presents a black picture. In this case, the ambient light transmitted to the first polarizer 600 is converted into the first polarized light L1 after passing through the first polarizer 600, and the polarization direction of the first polarized light L1 is not changed after the first polarized light L1 passes through the first liquid crystal layer 400. In this way, the first polarized light L1 is absorbed by the light absorbing layer 800 after passing through the transflective film 700, and the display portion of the liquid crystal handwriting board 000 displays a black picture as a whole. That is, the display portion of the liquid crystal handwriting board 000 does not display a picture. The display mode of the display portion of the liquid crystal handwriting board 000 in this case is referred to as a normally black display mode.

In the case that an electric field is formed in the display portion of the liquid crystal handwriting board 000, that is, the display portion of the liquid crystal handwriting board 000 is powered on, the display portion of the liquid crystal handwriting board 000 presents a display picture. In this case, the ambient light transmitted to the first polarizer 600 is converted into the first polarized light L1 after passing through the first polarizer 600, and the polarization direction of the first polarized light L1 is changed after the first polarized light L1 passes through the first liquid crystal layer 400, that is, the first polarized light L1 passing through the first liquid crystal layer 400 is converted into elliptically polarized light. In the elliptically polarized light, the polarized light with the polarization direction same as the polarization direction of first polarized light L1 is absorbed by the light absorbing layer 800 after passing through the transflective film 700, while the polarized light with the polarization direction same as the polarization direction of the second polarized light L2 is reflected by the transflective film 700. The reflected second polarized light L2 is also converted into elliptically polarized light after passing through the first liquid crystal layer 400, and the polarized light with the polarization direction same as the polarization direction of the first polarized light L1 in the elliptically polarized light is transmitted out of the first polarizer 600. In this way, the display portion of the liquid crystal handwriting board 000 displays a picture.

It should be noted that the elliptically polarized light refers to polarized light that can be decomposed into two polarization directions. For example, the elliptically polarized light is decomposed into the first polarized light L1 and the second polarized light L2. It should be further noted that, when the display portion of the liquid crystal handwriting board 000 displays a picture, the liquid crystal molecules in the first liquid crystal layer 400 are deflected at different degrees, and the first liquid crystal layer 400 also converts the first polarized light L1 into the elliptically polarized light in different degrees, that is, the elliptically polarized light is decomposed into different amounts of first polarized light L1 and second polarized light L2. In this way, the picture displayed in the display portion of the liquid crystal handwriting board 000 can be adjusted by controlling the deflection degree of the liquid crystal molecules in the first liquid crystal layer 400.

Figure 11:
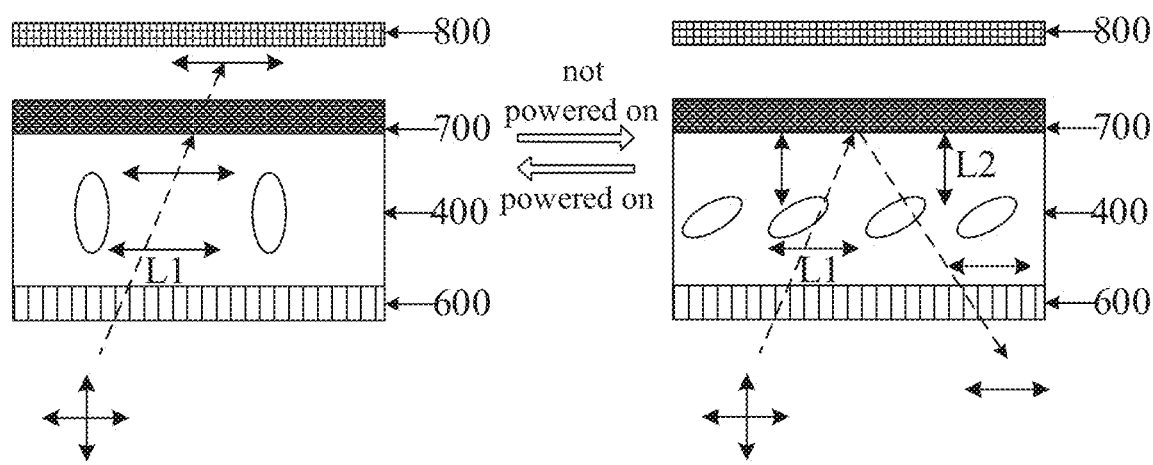
FIG. 11 is a schematic diagram showing another display principle of the display portion of the liquid crystal handwriting board shown in FIG. 9 according to some embodiments of the present disclosure.

Referring to FIG. 11, FIG. 11 is a schematic diagram showing another display principle of the display portion of the liquid crystal handwriting board shown in FIG. 9 according to some embodiments of the present disclosure. In the case that no electric field is formed in the display portion of the liquid crystal handwriting board 000, that is, the display portion of the liquid crystal handwriting board 000 is not powered on, the display portion of the liquid crystal handwriting board 000 completely presents a white picture. In this case, the ambient light transmitted to the first polarizer 600 is converted into the first polarized light L1 after passing through the first polarizer 600, and the polarization direction of the first polarized light L1 is changed after the first polarized light L1 passes through the first liquid crystal layer 400, that is, the first polarized light L1 passing through the first liquid crystal layer 400 rotates by 90 degrees and is converted into the second polarized light L2. The second polarized light L2 is reflected by the transflective film 700 and passes through the first liquid crystal layer 400 again, and the second polarized light L2 is converted into the first polarized light L1 again after passing through the first liquid crystal layer 400. As such, the first polarized light L1 passes through the first polarizer 600 and is transmitted out of the liquid crystal handwriting board 000, and the display portion of the liquid crystal handwriting board 000 displays a white picture as a whole. That is, the display portion of the liquid crystal handwriting board 000 does not display a picture. The display mode of the display portion of the liquid crystal handwriting board 000 in this case is referred to as a normally white display mode.

In the case that an electric field is formed in the display portion of the liquid crystal handwriting board 000, that is, the display portion of the liquid crystal handwriting board 000 is powered on, the display portion of the liquid crystal handwriting board 000 presents a display picture. In this case, the light transmitted to the first polarizer 600 is converted into the first polarized light L1 after passing through the first polarizer 600, and the polarization direction of the first polarized light L1 is not changed after the first polarized light L1 passes through the first liquid crystal layer 400. In this way, the first polarized light L1 is absorbed by the light absorbing layer 800 after passing through the transflective film 700, and the display portion of the liquid crystal handwriting board 000 displays a picture.

Figure 12:
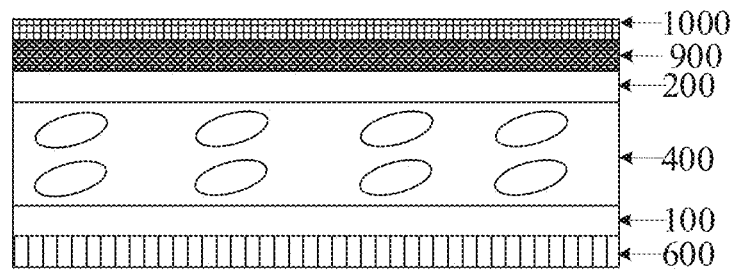
FIG. 12 is a schematic structural diagram of a display portion of another liquid crystal handwriting board according to some embodiments of present disclosure.

In a second exemplary implementation, please refer to FIG. 12. FIG. 12 is a schematic structural diagram of a display portion of another liquid crystal handwriting board according to some embodiments of the present disclosure. The liquid crystal handwriting board 000 further includes a first polarizer 600, a third polarizer 900 and a reflective layer 1000. The first liquid crystal layer 400 is disposed between the first polarizer 600 and the third polarizer 900, the third polarizer 900 is disposed on the side of the first liquid crystal layer 400 away from the first substrate 100, and the reflective layer 1000 is disposed on the side of the third polarizer 900 away from the first liquid crystal layer 400. For example, the third polarizer 900 is disposed on the side of the second substrate 200 away from the first liquid crystal layer 400. Here, the first polarizer 600 transmits the polarized light with a polarization direction same as the polarization direction of the first polarizer 600, and the third polarizer 900 also transmits the polarized light with a polarization direction same as the polarization direction of the third polarizer 900. For example, the polarized light passing through the first polarizer 600 is third polarized light L3, and the polarized light passing through the third polarizer 900 is fourth polarized light L4. The reflective layer 1000 is configured to reflect incident light. For example, the reflective layer 1000 is made of a metal material having a high reflectivity, such that the reflective layer 1000 reflects the polarized light transmitted from the third polarizer 900.

In the present disclosure, there are two display modes based on whether the first pixel electrode 102 in the display portion of the liquid crystal handwriting board 000 and the common electrode are in the same substrate, which is the same as the first exemplary implementation. For the second exemplary implementation, the present disclosure is also illustratively described by taking the following two display principles as examples.

Figure 13:
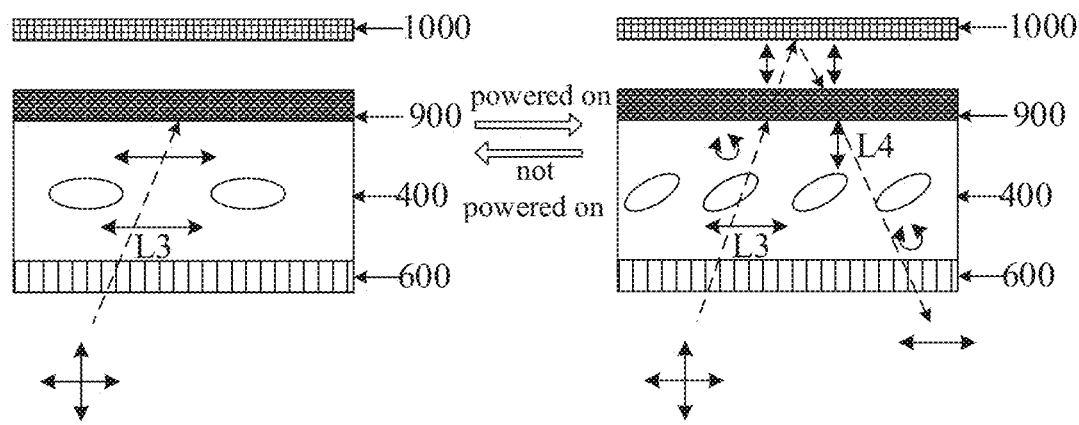
FIG. 13 is a schematic diagram showing a display principle of the display portion of the liquid crystal handwriting board shown in FIG. 12 according to some embodiments of the present disclosure.

For the first display principle, please refer to FIG. 13. FIG. 13 is a schematic diagram showing the display principle of the display portion of the liquid crystal handwriting board shown in FIG. 12 according to some embodiments of the present disclosure. The polarization direction of the first polarizer 600 in the liquid crystal handwriting board 000 is perpendicular to the polarization direction of the third polarizer 900. In the case that no electric field is formed in the display portion of the liquid crystal handwriting board 000, that is, the display portion of the liquid crystal handwriting board 000 is not powered on, the display portion of the liquid crystal handwriting board 000 completely presents a black picture. In this case, the ambient light transmitted to the first polarizer 600 is converted into the third polarized light L3 after passing through the first polarizer 600, and the polarization direction of the third polarized light L3 is not changed after the third polarized light L3 passes through the first liquid crystal layer 400. In this way, the third polarized light L3 is absorbed by the third polarizer 900 after being transmitted to the third polarizer 900, and the display portion of the liquid crystal handwriting board 000 displays a black picture as a whole. That is, the display portion of the liquid crystal handwriting board 000 does not display a picture. The display mode of the display portion of the liquid crystal handwriting board 000 in this case is referred to as a normally black display mode.

In the case that an electric field is formed in the display portion of the liquid crystal handwriting board 000, that is, the display portion of the liquid crystal handwriting board 000 is powered on, the display portion of the liquid crystal handwriting board 000 presents a display picture. In this case, the ambient light transmitted to the first polarizer 600 is converted into the third polarized light L3 after passing through the first polarizer 600, and the polarization direction of the third polarized light L3 is changed after the third polarized light L3 passes through the first liquid crystal layer 400, that is, the third polarized light L3 passing through the first liquid crystal layer 400 is converted into elliptically polarized light. In the elliptically polarized light, the fourth polarized light L4 with the polarization direction perpendicular to the polarization direction of the third polarized light L3 is reflected by the reflective layer 1000 after passing through the third polarizer 900, and the reflected fourth polarized light L4 is also converted into elliptically polarized light after passing through the first liquid crystal layer 400. The polarized light with the polarization direction same as the polarization direction of the third polarized light L3 in the elliptically polarized light is transmitted out of the first polarizer 600, and the display portion of the liquid crystal handwriting board 000 displays a picture.

For the second display principle, the polarization direction of the first polarizer 600 in the liquid crystal handwriting board 000 is either perpendicular or parallel to the polarization direction of the third polarizer 900. The embodiments of the present disclosure are described by taking the following two situations as examples.

Figure 14:
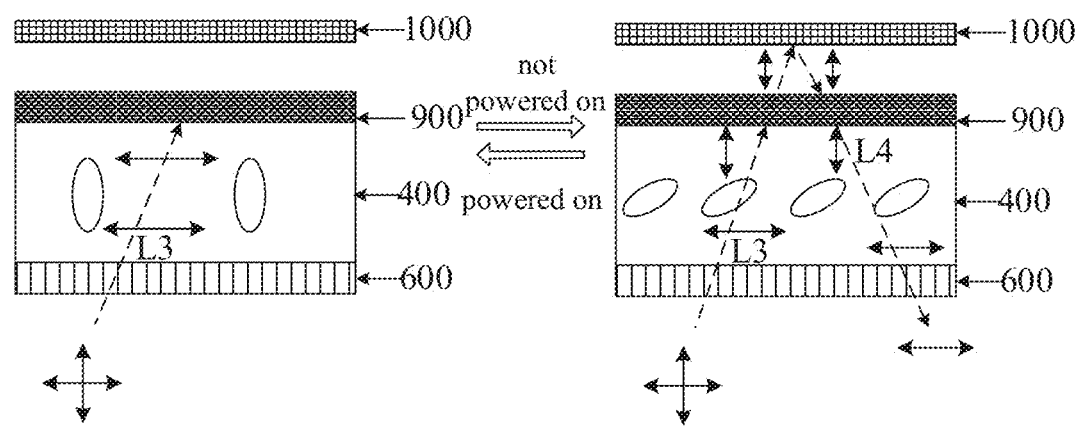
FIG. 14 is a schematic diagram showing another display principle of the display portion of the liquid crystal handwriting board shown in FIG. 12 according to some embodiments of the present disclosure.

In the first situation, when the polarization direction of the first polarizer 600 is perpendicular to the polarization direction of the third polarizer 900, please refer to FIG. 14. FIG. 14 is a schematic diagram showing another display principle of the display portion of the liquid crystal handwriting board shown in FIG. 12 according to some embodiments of the present disclosure. In the case that no electric field is formed in the display portion of the liquid crystal handwriting board 000, that is, the display portion of the liquid crystal handwriting board 000 is not powered on, the display portion of the liquid crystal handwriting board 000 completely presents a white picture. In this case, the ambient light transmitted to the first polarizer 600 is converted into the third polarized light L3 after passing through the first polarizer 600, and the polarization direction of the third polarized light L3 is changed after the third polarized light L3 passes through the first liquid crystal layer 400, that is, the third polarized light L3 passing through the first liquid crystal layer 400 rotates by 90 degrees and is converted into the fourth polarized light L4. The fourth polarized light L4 passes through the third polarizer 900, passes through the first liquid crystal layer 400 again, and is converted into the third polarized light L3 again after passing through the first liquid crystal layer 400. In this way, the third polarized light L3 passes through the first polarizer 600 and is transmitted out of the liquid crystal handwriting board 000, and the display portion of the liquid crystal handwriting board 000 presents a white picture as a whole. That is, the display portion of the liquid crystal handwriting board 000 does not display a picture. The display mode of the display portion of the liquid crystal handwriting board 000 in this case is referred to as a normally white display mode.

In the case that an electric field is formed in the display portion of the liquid crystal handwriting board 000, that is, the display portion of the liquid crystal handwriting board 000 is powered on, the display portion of the liquid crystal handwriting board 000 presents a display picture. In this case, the light transmitted to the first polarizer 600 is converted into the third polarized light L3 after passing through the first polarizer 600, and the polarization direction of the third polarized light L3 is not changed after the third polarized light L3 passes through the first liquid crystal layer 400. In this way, the third polarized light L3 is absorbed by the third polarizer 900 after being transmitted to the third polarizer 900, and the display portion of the liquid crystal handwriting board 000 displays a picture.

Figure 15:
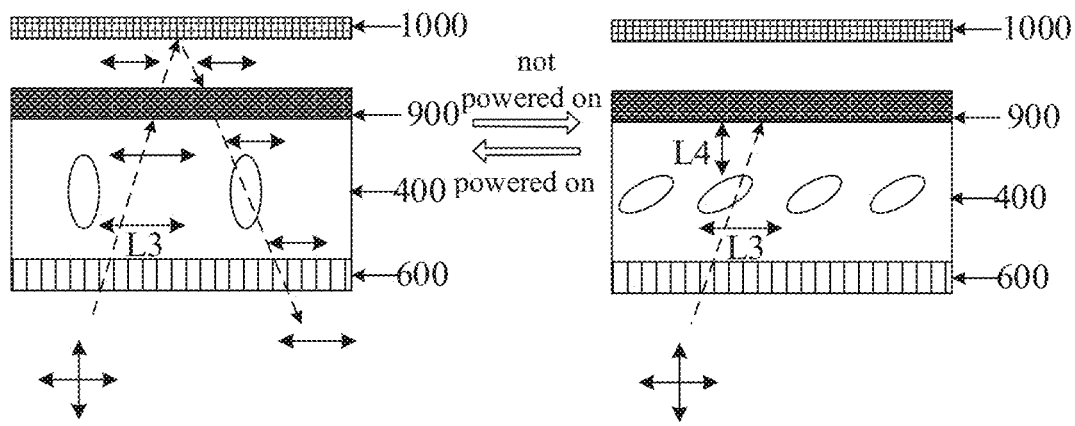
FIG. 15 is a schematic diagram showing still another display principle of the display portion of the liquid crystal handwriting board shown in FIG. 12 according to some embodiments of the present disclosure.

In the second situation, when the polarization direction of the first polarizer 600 is parallel to the polarization direction of the third polarizer 900, please refer to FIG. 15. FIG. 15 is a schematic diagram showing still another display principle of the display portion of the liquid crystal handwriting board shown in FIG. 12 according to some embodiments of the present disclosure. In the case that no electric field is formed in the display portion of the liquid crystal handwriting board 000, that is, the display portion of the liquid crystal handwriting board 000 is not powered on, the display portion of the liquid crystal handwriting board 000 completely presents a black picture. In this case, the ambient light transmitted to the first polarizer 600 is converted into the third polarized light L3 after passing through the first polarizer 600, and the polarization direction of the third polarized light L3 is changed after the third polarized light L3 passes through the first liquid crystal layer 400, that is, the third polarized light L3 passing through the first liquid crystal layer 400 rotates by 90 degrees and is converted into to the fourth polarized light L4. The fourth polarized light L4 is absorbed by the third polarizer 900 after being transmitted to the third polarizer 900, and the display portion in the liquid crystal handwriting board 000 displays a black picture as a whole. That is, the display portion of the liquid crystal handwriting board 000 does not display a picture. The display mode of the display portion of the liquid crystal handwriting board 000 in this case is referred to as a normally black display mode.

In the case that an electric field is formed in the display portion of the liquid crystal handwriting board 000, that is, the display portion of the liquid crystal handwriting board 000 is powered on, the display portion of the liquid crystal handwriting board 000 presents a display picture. In this case, the ambient light transmitted to the first polarizer 600 is converted into the third polarized light L3 after passing through the first polarizer 600, and the polarization direction of the third polarized light L3 is not changed after the third polarized light L3 passes through the first liquid crystal layer 400. In this way, the third polarized light L3 is reflected by the reflective layer 1000 after passing through the third polarizer 900, and the reflected third polarized light L3 is transmitted out of the first polarizer 600 after passing through the first liquid crystal layer 400. In this way, the display portion of the liquid crystal handwriting board 000 displays a picture.

Figure 16:
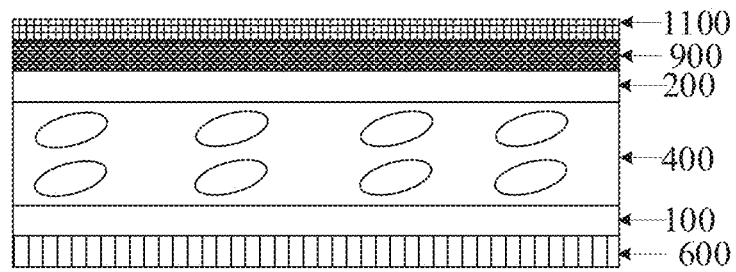
FIG. 16 is a schematic structural diagram of a display portion of still another liquid crystal handwriting board according to some embodiments of the present disclosure.

In the third exemplary implementation, please refer to FIG. 16. FIG. 16 is a schematic structural diagram of another display portion of a liquid crystal handwriting board according to some embodiments of the present disclosure. The liquid crystal handwriting board 000 further includes a first polarizer 600, a third polarizer 900 and a backlight source 1100. The first liquid crystal layer 400 is disposed between the first polarizer 600 and the third polarizer 900, the third polarizer 900 is disposed on the side of the first liquid crystal layer 400 away from the first substrate 100, and the backlight source 1100 is disposed on the side of the third polarizer 900 away from the first liquid crystal layer 400. For example, the backlight source 1100 is disposed on the side of the second substrate 200 away from the first liquid crystal layer 400. Here, the backlight source 1100 emits target light, and the target light is transmitted to the third polarizer 900. The first polarizer 600 transmits the polarized light with a polarization direction same as the polarization direction of the first polarizer 600, and the third polarizer 900 also transmits the polarized light with a polarization direction same as the polarization direction of the third polarizer 900. For example, the polarized light passing through the third polarizer 900 is fifth polarized light L5, and the polarized light passing through the first polarizer 600 is sixth polarized light L6.

In the present disclosure, there are two display modes based on whether the first pixel electrode 102 in the display portion of the liquid crystal handwriting board 000 and the common electrode are in the same substrate, which is the same as the first exemplary implementation and the second exemplary implementation described above. Since the display principles corresponding to the two display modes have been described in the above embodiments, in order to avoid repetition, the third exemplary implementation is described only by taking an example in which the first pixel electrode 102 and the common electrode are not in the same substrate, and the display principle of the display portion of the liquid crystal handwriting board 000 is the second display principle in the following embodiments, i.e., the TN display principle.

Figure 17:
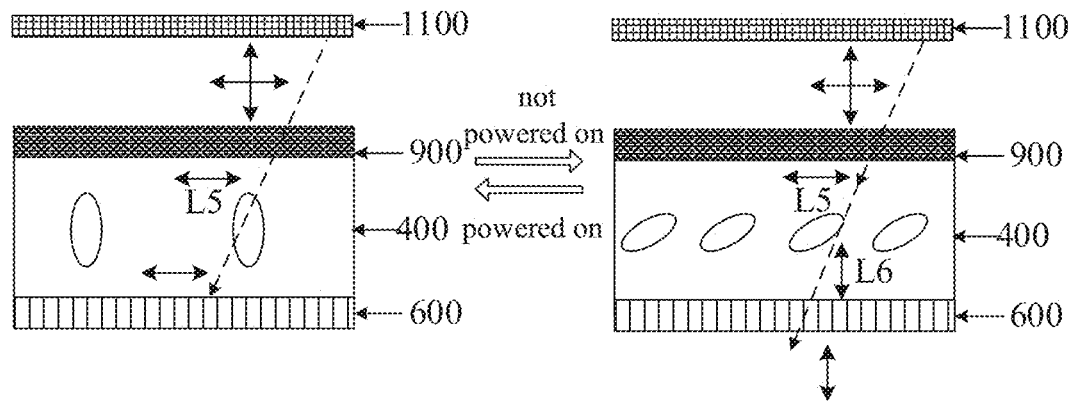
FIG. 17 is a schematic diagram showing a display principle of the display portion of the liquid crystal handwriting board shown in FIG. 16 according to some embodiments of the present disclosure.

In this situation, when the polarization direction of the first polarizer 600 is perpendicular to the polarization direction of the third polarizer 900, please refer to FIG. 17. FIG. 17 is a schematic diagram showing a display principle of the display portion of the liquid crystal handwriting board shown in FIG. 16 according to some embodiments of the present disclosure. In the case that no electric field is formed in the display portion of the liquid crystal handwriting board 000, that is, the display portion of the liquid crystal handwriting board 000 is not powered on, the display portion of the liquid crystal handwriting board 000 completely presents a white picture. In this case, the target light transmitted to the third polarizer 900 is converted into the fifth polarized light L5 after passing through the third polarizer 900, and the polarization direction of the fifth polarized light L5 is changed after the fifth polarized light L5 passes through the first liquid crystal layer 400, that is, the fifth polarized light L5 passing through the first liquid crystal layer 400 rotates by 90 degrees and is converted into the sixth polarized light L6. The sixth polarized light L6 passes through the first polarizer 600 and is transmitted out of the liquid crystal handwriting board 000, and the display portion of the liquid crystal handwriting board 000 displays a white picture as a whole. That is, the display portion of the liquid crystal handwriting board 000 does not display a picture. The display mode of the display portion of the liquid crystal handwriting board 000 in this case is referred to as a normally white display mode.

In the case that an electric field is formed in the display portion of the liquid crystal handwriting board 000, that is, the display portion of the liquid crystal handwriting board 000 is powered on, the display portion of the liquid crystal handwriting board 000 presents a display picture. In this case, the target light transmitted to the third polarizer 900 is converted into the fifth polarized light L5 after passing through the third polarizer 900, and the polarization direction of the fifth polarized light L5 is not changed after the fifth polarized light L5 passes through the first liquid crystal layer 400. In this way, the fifth polarized light L5 is absorbed by the first polarizer 600 after being transmitted to the first polarizer 600, and the display portion of the liquid crystal handwriting board 000 displays a picture.

In the following embodiments, the structure corresponding to the two display principles of the display portion in the above three exemplary implementations is illustratively described in the case where the transparent electrode 103 in the liquid crystal handwriting board 000 is the shield electrode.

Figure 18:
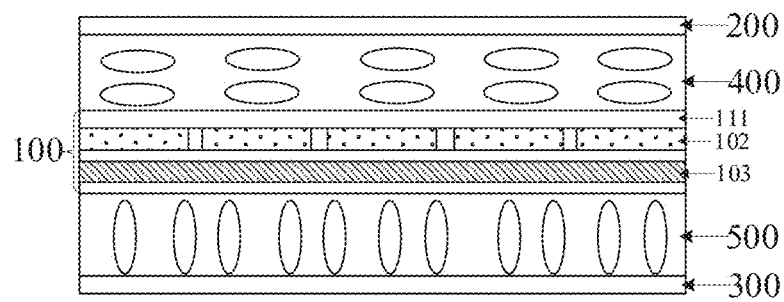
FIG. 18 is a schematic structural diagram of a liquid crystal handwriting board according to some embodiments of the present disclosure.

For the first display principle in the above embodiments, that is, for the situation where the first pixel electrode 102 in the display portion of the liquid crystal handwriting board 000 and the common electrode are in the same substrate, please refer to FIG. 18. FIG. 18 is a schematic structural diagram of a liquid crystal handwriting board according to some embodiments of the present disclosure. The first substrate 100 in the liquid crystal handwriting board 000 further includes a second common electrode 111. The position of the second common electrode 111 in the first substrate 100 has the following two situations.

Figure 19:
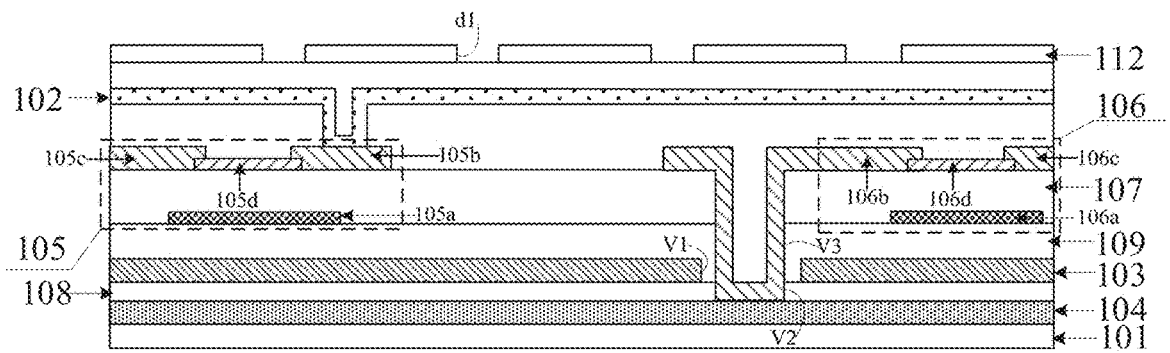
FIG. 19 is a schematic structural diagram of a first substrate in the liquid crystal handwriting board shown in FIG. 18.

In the first situation, please refer to FIG. 19, and FIG. 19 is a schematic structural diagram of a first substrate in the liquid crystal handwriting board shown in FIG. 18. The second common electrode 112 is disposed on the side of the first pixel electrode 102 away from the first base 101, and the second common electrode 112 is insulated from the first pixel electrode 102.

In this situation, after the voltage is applied to the first pixel electrode 102, a voltage difference is generated between the first pixel electrode 102 and the second common electrode 112, such that the liquid crystal molecules in the first liquid crystal layer 400 deflect under the action of the electric field force. For example, the deflected liquid crystal molecules in the first liquid crystal layer 400 cause the polarized light having the same polarization direction as the first polarized light L1 to be converted into elliptically polarized light, and cause the polarized light having the same polarization direction as the second polarized light L2 to be converted into elliptically polarized light.

In the embodiments of the present disclosure, the display portion of the liquid crystal handwriting board 000 is provided with a plurality of sub-pixel regions 100a. One sub-pixel region 100a is provided with one first pixel electrode 102, and the portion, disposed in one sub-pixel region 100a, of the second common electrode 112 has at least one slit d1. Here, the extending directions of the plurality of slits d1 in one sub-pixel region 100a are the same, and the extending direction of each slit d1 is parallel to the extending direction of the first data line D1, or an angle is formed between the extending direction of each slit d1 and the extending direction of the first data line D1.

In the same one sub-pixel region 100a, the orthographic projection of the slit d1 on the first base 101 is within the orthographic projection of the first pixel electrode 102 on the first base 101. Here, the slit d1 is distributed within the range where the first pixel electrode 102 is, and the slit d1 enables the liquid crystal molecules in the first liquid crystal layer 400 to deflect more easily under the action of the electric field force.

It should be noted that since the second common electrode 112 is insulated from the first pixel electrode 102, a storage capacitor is formed between the second common electrode 112 and the first pixel electrode 102. Here, the storage capacitor is configured to maintain the voltage of the first pixel electrode 102, such that the voltage of the first pixel electrode 102 in the sub-pixel region 100a performing display in the display portion of the liquid crystal handwriting board 000 is effectively prevented from changing, which effectively improves the display effect of the display portion of the liquid crystal handwriting board 000.

Since the first pixel electrode 102 is also insulated from the transparent electrode 103, a storage capacitor is also formed between the first pixel electrode 102 and the transparent electrode 103. Here, since the insulating layer between the first pixel electrode 102 and the transparent electrode 103 includes the third insulating layer 110, the gate insulating layer 107 and the second insulating layer 109, the capacitance of the storage capacitor is small, and thus the response speed of the writing portion of the liquid crystal handwriting board 000 to the display portion of the liquid crystal handwriting board 000 is not affected.

Figure 20:
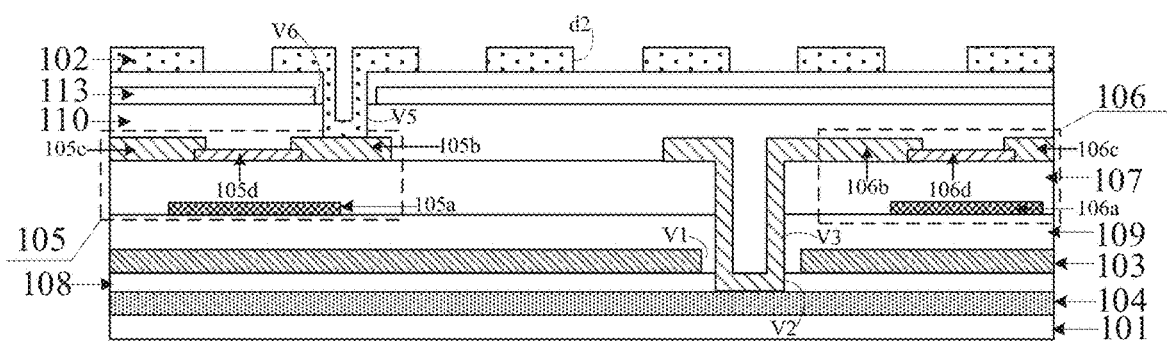
FIG. 20 is a schematic structural diagram of another first substrate in the liquid crystal handwriting board shown in FIG. 18.

In the first situation, please refer to FIG. 20, and FIG. 20 is a schematic structural diagram of another first substrate in the liquid crystal handwriting board shown in FIG. 18. The first substrate 100 further includes a second common electrode 113 disposed between the first pixel electrode 102 and the transparent electrode 103. The second common electrode 113 is insulated from the first pixel electrode 102 and is insulated from the transparent electrode 103, and the first pixel electrode 102 has at least one slit d2. Here, an insulating layer is provided between the second common electrode 113 and the first pixel electrode 102, such that short circuit is prevented from occurring between the second common electrode 113 and the first pixel electrode 102. The second common electrode 113 is provided with a sixth via hole V6. In this way, the first pixel electrode 102 sequentially passes through the insulating layer between the second common electrode 113 and the first pixel electrode 102, the sixth via hole V6 in the second common electrode 113, and the fifth via hole V5 in the third insulating layer 110 to be electrically connected to the first electrode 105b of the first thin film transistor 105.

In the present disclosure, the extending directions of the plurality of slits d2 in one sub-pixel region 100a are the same, and the extending direction of each slit d2 is parallel to the extending direction of the first data line D1, or an angle is formed between the extending direction of each slit d2 and the extending direction of the first data line D1. In the same one sub-pixel region 100a, the orthographic projection of the slit d2 on the first base 101 is within the orthographic projection of the second common electrode 113 on the first base 101. Here, the slit d2 is distributed within the range where the second common electrode 113 is, and the slit d2 enables the liquid crystal molecules in the first liquid crystal layer 400 to deflect more easily under the action of the electric field force.

It should be noted that since the second common electrode 113 is insulated from the first pixel electrode 102, a storage capacitor is also formed between the second common electrode 113 and the first pixel electrode 102. Since the second common electrode 113 is also insulated from the transparent electrode 103, a storage capacitor is also formed between the second common electrode 113 and the transparent electrode 103. For the effect of the storage capacitor, please refer to the content in the foregoing embodiments, and details are not described herein again.

Figure 21:
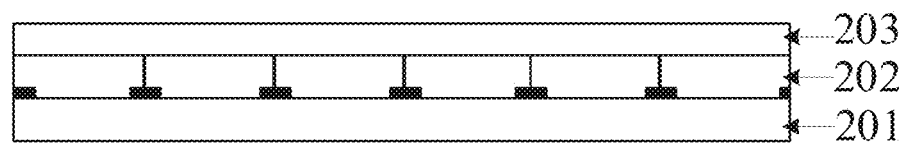
FIG. 21 is a schematic structural diagram of a second substrate in the liquid crystal handwriting board shown in FIG. 18.

In the present disclosure, with respect the above two situations, please refer to FIG. 21. FIG. 21 is a schematic structural diagram of a second substrate in the liquid crystal handwriting board shown in FIG. 18. The second substrate 200 further includes a second base 201, a color resist layer 202 disposed on the side of the second base 201 close to the first substrate 100, and a planarization layer 203 disposed on the side of the color resist layer 202 away from the second base 201. For example, the color resist layer 202 is disposed on a side close to the first liquid crystal layer 400. Here, the color resist layer 202 includes a color filter disposed in each sub-pixel region 100a and a black matrix disposed between two adjacent color filters.

The color filters distributed in the second substrate 200 include a red filter, a green filter, and a blue filter. The color resist layer 202 filters light of different colors, such that the liquid crystal handwriting board 000 displays a color picture. Here, the planarization layer 203 is a transparent insulating layer. The second substrate 200 planarizes the sides, away from the second base 201, of the plurality of color filters through the planarization layer 203, such that the sides, away from the second base 201, of the plurality of color filters have a good flatness, thereby improving the overall flatness of the second substrate 200. In this way, the liquid crystal molecules, in contact with the second substrate 200, in the first liquid crystal layer 400 can be evenly distributed.

Figure 22:
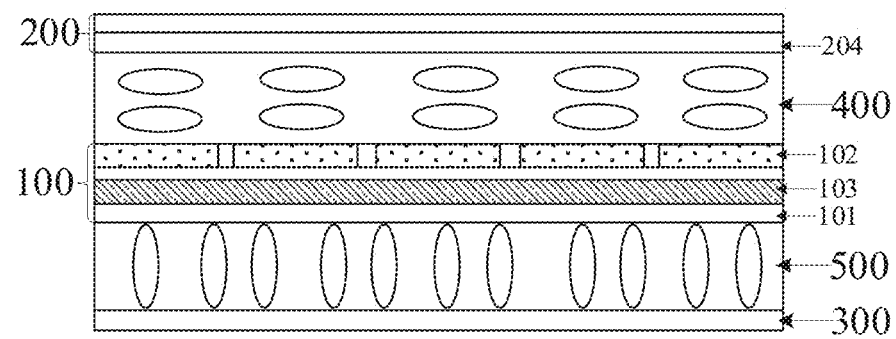
FIG. 22 is a schematic structural diagram of another liquid crystal handwriting board according to some embodiments of the present disclosure.
Figure 23:
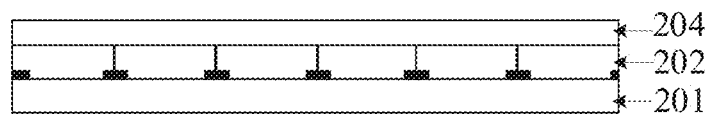
FIG. 23 is a schematic structural diagram of a second substrate in the liquid crystal handwriting board shown in FIG. 22.

For the second display principle in the above embodiments, that is, for the situation where the first pixel electrode 102 in the display portion of the liquid crystal handwriting board 000 and the common electrode are not in the same substrate, please refer to FIG. 22. FIG. 22 is a schematic structural diagram of another liquid crystal handwriting board according to some embodiments of the present disclosure. The second substrate 200 in the liquid crystal handwriting board 000 further includes a second common electrode 204. For example, referring to FIG. 23, which is a schematic structural diagram of a second substrate in the liquid crystal handwriting board shown in FIG. 22, the second substrate 200 includes a second base 201, a color resist layer disposed on the side of the second base 201 close to the first substrate 100, and a second common electrode 204 disposed on the side of the color resist layer 202 away from the second base 201. The second common electrode 204 is a planar structure on a whole layer. It should be noted that the structure of the first substrate 100 in the liquid crystal handwriting board shown in FIG. 22 is the structure shown in FIG. 6, and details are not described herein again.

In this situation, after the first pixel voltage is applied to the first pixel electrode 102, a voltage difference is generated between the first pixel electrode 102 and the second common electrode 204 in the second substrate 200, and the liquid crystal molecules in the first liquid crystal layer 400 deflect under the action of the electric field force. For example, the deflected liquid crystal molecules in the first liquid crystal layer 400 cause the first polarized light L1 to rotate by 90 degrees to convert into the second polarized light L2, and also cause the second polarized light L2 to rotate by 90 degrees to convert into the first polarized light L1.

In the embodiments of the present disclosure, because the display portion of the liquid crystal handwriting board 000 is in a plurality of structures, there are a plurality of situations for the position of the first polarizer 600. In the embodiments of the present disclosure, the position of the first polarizer 600 is illustratively described in the following two situations by taking an example in which the structure of the display portion of the liquid crystal handwriting board 000 is made reference to the structure of the display portion in the first exemplary implementation.

Figure 24:
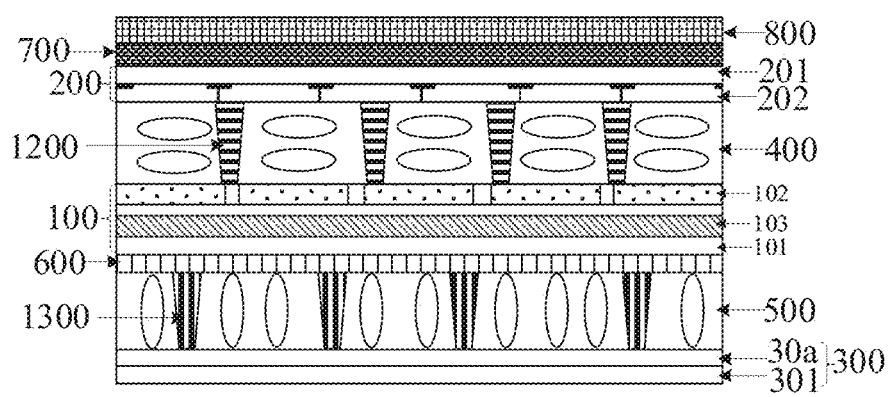
FIG. 24 is a schematic structural diagram of a liquid crystal handwriting board according to a first example implementation of the present disclosure.

In the first situation, please refer to FIG. 24 and FIG. 24 is a schematic structural diagram of the liquid crystal handwriting board according to the first exemplary implementation of the present disclosure. The first polarizer 600 is disposed on a side of the first substrate 100. For example, the first polarizer 600 is disposed on the side, away from the first liquid crystal layer 400, of the first base 101 in the first substrate 100. In this way, the ambient light is transmitted to the first polarizer 600 after passing through the second liquid crystal layer 500 in the liquid crystal handwriting board 000, and the ambient light is converted into the first polarized light L1 by the first polarizer 600. Then, the first polarized light L1 sequentially passes through the first substrate 100, the first liquid crystal layer 400, and the second substrate 200 to be transmitted to the transflective film 700. Here, the light intensity of the light is reduced after the light passes through the first polarizer 600. Therefore, when the first polarizer 600 is disposed on the side, away from the first liquid crystal layer 400, of the first base 101 in the first substrate 100, the ambient light transmitted to the writing portion of the liquid crystal handwriting board 000 is reflected by the second liquid crystal layer 500 before being transmitted to the first polarizer 600. Thus, the writing portion of the liquid crystal handwriting board 000 has a high brightness, and the writing effect is good.

In this situation, in the process of manufacturing the liquid crystal handwriting board 000 shown in FIG. 24, the first substrate 100 and the second substrate 200 need to be manufactured first, and the first substrate 100 and the second substrate 200 are aligned. Then, liquid crystals are instilled between the first substrate 100 and the second substrate 200, to form the first liquid crystal layer 400 between the first substrate 100 and the second substrate 200. Next, the first polarizer 600 is attached to the other side of the first substrate 100, and the first substrate 100 and the third substrate 300 are aligned. Finally, liquid crystals are instilled between the first substrate 100 and the third substrate 300, to form the second liquid crystal layer 500 between the first substrate 100 and the third substrate 300.

Figure 25:
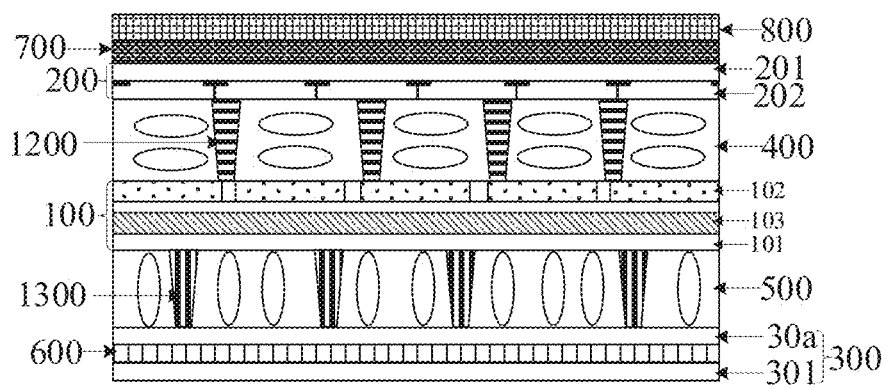
FIG. 25 is a schematic structural diagram of another liquid crystal handwriting board according to a first example implementation of the present disclosure.

In the second situation, please refer to FIG. 25, and FIG. 25 is a schematic structural diagram of another liquid crystal handwriting board according to the first exemplary implementation of the present disclosure. For example, the first polarizer 600 is disposed on the side, away from the second liquid crystal layer 500, of the flexible base 301 in the third substrate 300. In this way, after passing through the flexible base 301 in the third substrate 300, the ambient light is transmitted to the first polarizer 600 and is converted into the first polarized light by the first polarizer 600. Then, the first polarized light sequentially passes through the writing portion of the liquid crystal handwriting board 000, the first liquid crystal layer 400, and the second substrate 200 and is transmitted to the transflective film 700.

In this situation, in the process of manufacturing the liquid crystal handwriting board 000 shown in FIG. 25, the first substrate 100 and the second substrate 200 need to be manufactured first, and the first substrate 100 and the second substrate 200 are aligned. Then, liquid crystals are instilled between the first substrate 100 and the second substrate 200, to form the first liquid crystal layer 400 between the first substrate 100 and the second substrate 200. Next, the first polarizer 600 is attached inside the third substrate 300, and the first substrate 100 and the third substrate 300 are aligned. Finally, liquid crystals are instilled between the first substrate 100 and the third substrate 300, to form the second liquid crystal layer 500 between the first substrate 100 and the third substrate 300.

In some embodiments, the liquid crystal handwriting board 000 further includes a first spacer 1200 disposed between the first substrate 100 and the second substrate 200, and a first spacer 1300 disposed between the first substrate 100 and the third substrate 300. The first spacer 1200 is fixed to one of the first substrate 100 and the second substrate 200, and the first spacer 1300 is fixed to the first substrate 100.

The spacers in the liquid crystal handwriting panel 000 are made from an elastic material, so as to provide elastic deformation when the liquid crystal handwriting panel 000 is subjected to external pressure. For example, the first spacer 1200 supports the first substrate 100 and the second substrate 200, to avoid the arrangement of the liquid crystal molecules in the first liquid crystal layer 400 from being affected when the liquid crystal handwriting board 000 is pressed. The first spacer 1300 supports the first substrate 100 and the third substrate 300, to avoid the arrangement of the liquid crystal molecules in the second liquid crystal layer 500 from being affected when the liquid crystal handwriting board 000 is pressed.

In summary, the embodiments of the present disclosure provide a liquid crystal handwriting board. The liquid crystal handwriting board includes: a first substrate, a second substrate disposed on one side of the first substrate, a third substrate disposed on the other side of the first substrate, a first liquid crystal layer disposed between the first substrate and the second substrate, and a second liquid crystal layer disposed between the first substrate and the third substrate. The first substrate, the first liquid crystal layer and the second substrate form the display portion of the liquid crystal handwriting board. Therefore, the liquid crystal molecules in the first liquid crystal layer deflect under the action of the electric field force formed between the first substrate and the first liquid crystal layer, such that the liquid crystal handwriting board displays a picture. In addition, the first substrate, the second liquid crystal layer and the third substrate form the writing portion of the liquid crystal handwriting board. Therefore, the liquid crystal molecules in the second liquid crystal layer can transition from the focal conic texture into the planar texture after the third substrate is subjected to external pressure, and the liquid crystal molecules transitioned into the focal conic texture can reflect light of a particular wavelength in the incident ambient light, so that the writing portion of the liquid crystal handwriting board can display the handwritings. Therefore, the liquid crystal handwriting board in the present disclosure can not only display the handwritings through the writing portion, but also display the picture through the display portion. Thus, the liquid crystal handwriting board in the present disclosure has the writing function and the display function at the same time, which effectively enriches the function of the liquid crystal handwriting board.

The embodiments of the present disclosure further provide a method for manufacturing a liquid crystal handwriting board. The method includes the following steps.

In step S1, a first substrate provided with a first pixel electrode and a transparent electrode is formed.

In step S2, a second substrate is formed.

In step S3, the first substrate and the second substrate are aligned, and a first liquid crystal layer is formed between the first substrate and the second substrate.

In step S4, a third substrate is formed.

In step S5, the first substrate and the third substrate are aligned, and a second liquid crystal layer is formed between the first substrate and the third substrate.

The first substrate includes a first base, and a first pixel electrode and a transparent electrode that are disposed on the side of the first base close to the second substrate. The first pixel electrode is insulated from the transparent electrode, and the first pixel electrode is closer to the second substrate than the transparent electrode is.

The first substrate, the first liquid crystal layer and the second substrate are configured to form the display portion of the liquid crystal handwriting board; and the first substrate, the second liquid crystal layer and the third substrate are configured to form the writing portion of the liquid crystal handwriting board.

It should be clearly understood by those skilled in the art that, for the convenience and brevity of descriptions, for the specific principle of the liquid crystal handwriting board, please make reference to the corresponding contents in the foregoing embodiments about structure of the liquid crystal handwriting board, and details are not described herein again.

It should be noted that the dimensions of the layers and regions are scaled up for the clear illustration of the drawings. It will be appreciated that when an element or layer is referred to as being "on" or another element or layer, it is directly on the other element or an intermediate layer exists. In addition, it will be appreciated that when an element or layer is referred to as being "under" another element or layer, it is directly under the other element or more than one intermediate layer or element exits. In addition, it will be appreciated that when a layer or element is referred to as being "between" two layers or elements, it is the only layer between two layers or elements, or more than one intermediate layer or element exits. The similar reference numerals indicate the similar elements throughout.

In the present disclosure, the terms "first" and "second" are used for descriptive purposes only and are not to be construed as indicating or implying any relative importance. The term "a plurality of" refers to two or more, unless specifically defined otherwise.

The foregoing descriptions are merely optional embodiments of the present disclosure and are not intended to limit the present disclosure. Any modifications, equivalent replacements, and improvements within the spirit and principles of the present disclosure shall be included within the protection scope of the present disclosure.

What is claimed is:

1. A liquid crystal handwriting board, comprising: a first substrate, a second substrate disposed on a side of the first substrate, a third substrate disposed on a side of the first substrate away from the second substrate, a first liquid crystal layer disposed between the first substrate and the second substrate, and a second liquid crystal layer disposed between the first substrate and the third substrate; wherein
the first substrate comprises: a first base, and a first pixel electrode and a transparent electrode that are disposed on a side of the first base close to the second substrate, wherein the first pixel electrode is insulated from the transparent electrode, and the first pixel electrode is closer to the second substrate than the transparent electrode is;
wherein the first substrate, the first liquid crystal layer and the second substrate are configured to form a display portion of the liquid crystal handwriting board; and the first substrate, the second liquid crystal layer and the third substrate are configured to form a writing portion of the liquid crystal handwriting board;
wherein the transparent electrode is a shield electrode, and the first substrate further comprises a second pixel electrode disposed on a side of the transparent electrode close to the first base, wherein the second pixel electrode is insulated from the transparent electrode;
wherein a plurality of first pixel electrodes and a plurality of second pixel electrodes are provided, wherein one of the second pixel electrodes corresponds to at least one of the first pixel electrodes; and
wherein an orthographic projection of the first pixel electrode on the first base is within an orthographic projection of the corresponding second pixel electrode on the first base.

2. The liquid crystal handwriting board according to claim 1, wherein the first substrate further comprises a first thin film transistor electrically connected to the first pixel electrode, and a second thin film transistor electrically connected to the second pixel electrode, wherein the first thin film transistor and the second thin film transistor are disposed in a same layer.

3. The liquid crystal handwriting board according to claim 2, wherein the second thin film transistor is disposed between the first pixel electrode and the transparent electrode, the transparent electrode is provided with a first via hole, and a first electrode of the second thin film transistor passes through the first via hole to be electrically connected to the second pixel electrode.

4. The liquid crystal handwriting board according to claim 3, wherein the first substrate further comprises: a first insulating layer disposed between the second pixel electrode and the transparent electrode, and a second insulating layer disposed between the second thin film transistor and the transparent electrode, wherein the first insulating layer is provided with a second via hole in communication with the first via hole, and the second insulating layer is provided with a third via hole in communication with the first via hole;

wherein an orthographic projection of the second via hole on the first base and an orthographic projection of the third via hole on the first base are both within an orthographic projection of the first via hole on the first base, and the first electrode of the second thin film transistor sequentially passes through the third via hole, the first via hole and the second via hole to be electrically connected to the second pixel electrode.

5. The liquid crystal handwriting board according to claim 2, wherein the first substrate further comprises: a plurality of first gate lines and a plurality of first data lines that are electrically connected to a plurality of first thin film transistors, and a plurality of second gate lines and a plurality of second data lines that are electrically connected to a plurality of second thin film transistors; wherein an orthographic projection of one of the first gate lines on the first base is between the orthographic projections of two adjacent rows of first pixel electrodes on the first base; and an orthographic projection of one of the first data lines on the first base is between the orthographic projections of two adjacent columns of first pixel electrodes on the first base; and an orthographic projection of one of the second gate lines on the first base is between the orthographic projections of two adjacent rows of second pixel electrodes on the first base; and an orthographic projection of one of the second data lines on the first base is between the orthographic projections of two adjacent columns of second pixel electrodes on the first base;

wherein the orthographic projection of one of the first gate lines on the first base and the orthographic projection of one of the second gate lines on the first base are simultaneously between the orthographic projections of two adjacent rows of second pixel electrodes on the first base; and wherein the orthographic projection of one of the first data lines on the first base and the orthographic projection of one of the second data lines on the first base are simultaneously between the orthographic projections of two adjacent columns of second pixel electrodes on the first base.

6. The liquid crystal handwriting board according to claim 5, wherein the first gate line and the second gate line are disposed in a same layer and made from a same material; and the first data line and the second data line are disposed in a same layer and made from a same material.

7. The liquid crystal handwriting board according to claim 1, wherein the third substrate comprises: a flexible base, and a first common electrode disposed on a side of the flexible base close to the second liquid crystal layer.

8. The liquid crystal handwriting board according to claim 1, wherein the transparent electrode is a common electrode of the writing portion, and the third substrate comprises: a flexible base, and a drive electrode disposed on a side of the flexible base close to the second liquid crystal layer.

9. The liquid crystal handwriting board according to claim 8, wherein an insulating layer is disposed between the first pixel electrode and the transparent electrode, and the first pixel electrode, the transparent electrode and the insulating layer are configured to form a storage capacitor.

10. The liquid crystal handwriting board according to claim 1, wherein liquid crystal molecules in the second liquid crystal layer are bistable liquid crystal molecules;

wherein the bistable liquid crystal molecules in the second liquid crystal layer are configured to: transition from a focal conic texture to a planar texture after the third substrate is subjected to external pressure; and transition from the planar texture to the focal conic texture after an electric field is formed between the first substrate and the third substrate.

11. The liquid crystal handwriting board according to claim 1, further comprising: a first polarizer and a transflective film, wherein the first liquid crystal layer is disposed between the first polarizer and the transflective film, and the transflective film is disposed on a side of the first liquid crystal layer away from the first substrate;

wherein the transflective film is configured to transmit first polarized light with a polarization direction parallel to a polarization direction of the first polarizer, and reflect second polarized light with a polarization direction perpendicular to the polarization direction of the first polarizer.

12. The liquid crystal handwriting board according to claim 11, further comprising: a light absorbing layer disposed on a side of the transflective film away from the first liquid crystal layer.

13. The liquid crystal handwriting board according to claim 12, wherein the light absorbing layer is a second polarizer or a black ink layer;

wherein the polarization direction of the first polarizer is perpendicular to a polarization direction of the second polarizer when the light absorbing layer is the second polarizer.

14. The liquid crystal handwriting board according to claim 11, wherein the second substrate comprises: a second base, a color resist layer disposed on a side of the second base close to the first substrate, and a planarization layer disposed on a side of the color resist layer away from the second base; and the first substrate further comprises: a second common electrode; wherein the second common electrode is disposed on a side of the first pixel electrode away from the first base, and the second common electrode is insulated from the first pixel electrode; the display portion is provided with a plurality of sub-pixel regions, one of the sub-pixel regions is provided with one of the first pixel electrodes, and a portion, disposed in one of the sub-pixel regions, of the second common electrode has at least one slit; or the second common electrode is disposed between the first pixel electrode and the transparent electrode, the second common electrode is insulated from the first pixel electrode and is insulated from the transparent electrode, and the first pixel electrode has at least one slit.

15. The liquid crystal handwriting board according to claim 11, wherein the second substrate comprises: a second base, a color resist layer disposed on a side of the second base close to the first substrate, and a second common electrode disposed on a side of the color resist layer away from the second base.

16. The liquid crystal handwriting board according to claim 11, wherein
the first polarizer is disposed on a side of the first substrate; or
the first polarizer is disposed on a side of the third substrate.

17. The liquid crystal handwriting board according to claim 1, further comprising: a first polarizer, a third polarizer, and a reflective layer, wherein the first liquid crystal layer is disposed between the first polarizer and the third polarizer, the third polarizer is disposed on a side of the first liquid crystal layer away from the first substrate, and the reflective layer is disposed on a side of the third polarizer away from the first liquid crystal layer;
or, a first polarizer, a third polarizer, and a backlight source, wherein the first liquid crystal layer is disposed between the first polarizer and the third polarizer, the third polarizer is disposed on a side of the first liquid crystal layer away from the first substrate, and the backlight source is disposed on a side of the third polarizer away from the first liquid crystal layer.

18. A method for manufacturing a liquid crystal handwriting board, comprising:
forming a first substrate provided with a first pixel electrode and a transparent electrode;
forming a second substrate;
aligning the first substrate with the second substrate, and forming a first liquid crystal layer between the first substrate and the second substrate;
forming a third substrate; and
aligning the first substrate with the third substrate, and forming a second liquid crystal layer between the first substrate and the third substrate;
wherein the first substrate comprises: a first base, and the first pixel electrode and the transparent electrode that are disposed on a side of the first base close to the second substrate, wherein the first pixel electrode is insulated from the transparent electrode, and the first pixel electrode is closer to the second substrate than the transparent electrode is;
wherein the first substrate, the first liquid crystal layer and the second substrate are configured to form a display portion of the liquid crystal handwriting board; and the first substrate, the second liquid crystal layer and the third substrate are configured to form a writing portion of the liquid crystal handwriting board;
wherein the transparent electrode is a shield electrode, and the first substrate further comprises a second pixel electrode disposed on a side of the transparent electrode close to the first base, wherein the second pixel electrode is insulated from the transparent electrode;
wherein a plurality of first pixel electrodes and a plurality of second pixel electrodes are provided, wherein one of the second pixel electrodes corresponds to at least one of the first pixel electrodes; and
wherein an orthographic projection of the first pixel electrode on the first base is within an orthographic projection of the corresponding second pixel electrode on the first base.

* * * * *